United States Patent
Leman et al.

(10) Patent No.: US 8,203,320 B2
(45) Date of Patent: Jun. 19, 2012

(54) SWITCHING MODE CONVERTERS

(75) Inventors: Brooks R. Leman, Santa Clara, CA (US); Keith Szolusha, Los Altos, CA (US); Nancy Tarng, San Jose, CA (US)

(73) Assignee: Linear Technology Corporation, Milpitas, CA (US)

( * ) Notice: Subject to any disclaimer, the term of this patent is extended or adjusted under 35 U.S.C. 154(b) by 718 days.

(21) Appl. No.: 12/349,641

(22) Filed: Jan. 7, 2009

(65) Prior Publication Data

US 2010/0171475 A1 Jul. 8, 2010

(51) Int. Cl.
*G05F 1/00* (2006.01)
(52) U.S. Cl. .................................................. 323/282
(58) Field of Classification Search ........... 323/282–285
See application file for complete search history.

(56) References Cited

U.S. PATENT DOCUMENTS

| | | | |
|---|---|---|---|
| 6,031,743 A * | 2/2000 | Carpenter et al. | 323/282 |
| 6,229,289 B1 * | 5/2001 | Piovaccari et al. | 323/282 |
| 6,476,589 B2 * | 11/2002 | Umminger et al. | 323/282 |
| 6,747,441 B2 | 6/2004 | Johnson et al. | |
| 7,339,356 B1 * | 3/2008 | Li et al. | 323/282 |

OTHER PUBLICATIONS

Bell, B., "Application Challenges of High Voltage Hysteric Buck Regulators", National Semiconductor, 2900 Semiconductor Drive, Santa Clara, CA 95051 p. 5.

* cited by examiner

*Primary Examiner* — Jue Zhang
(74) *Attorney, Agent, or Firm* — McDermott Will & Emery LLP

(57) ABSTRACT

A switch mode converter converts an input DC voltage applied at one level at the converter input to an output DC voltage at a second level at the converter output. A switch is arranged to switch the input DC voltage on and off during each cycle of a plurality of cycles. An energy storage unit temporarily stores energy from the input source voltage when the switch is on, and releases energy when the switch is off during each cycle. Input energy stored is equal to the energy released with each cycle and achieves equilibrium when the converter is operating into normal loads. A reset mechanism provides additional reset voltage during each cycle to achieve equilibrium when the converter is operating in a fault condition.

41 Claims, 17 Drawing Sheets

SWITCHING MODE CONVERTERS

FIELD

The application describes switching mode converters, and more particularly to a switching mode converter having a novel reset mechanism configured to release energy during each cycle to achieve volt second balance and equilibrium in a magnetic energy storage device when the converter is operating in a fault condition, e.g., overload or output short circuit conditions.

BACKGROUND

Switch mode converters are useful for many applications, including for example ones found in computers operating from 47 Hz to 63 Hz AC mains input voltage, flight avionics systems operating from 360 Hz to 440 Hz on board AC generators, network and telecom line cards operating from positive or negative battery plant DC input voltages, and portable electronic devices such as cellular phones and laptop computers, both of which are primarily supplied with power from batteries. Such electronic devices often contain several sub-circuits, each with its own output voltage level requirement different from that supplied by the input source voltage or battery (sometimes at a higher or lower level than the input source voltage, and possibly even at a negative voltage). Additionally, the input source voltage can surge or sag when connected to a load or the battery voltage increases while being charged, or can decline as its stored energy is delivered to the load. Switch mode DC to DC converters offer a method of stabilizing the output voltage derived from a partially raised or lowered or otherwise slowly varying input source voltage.

Switch mode converters typically convert one DC voltage level to another by storing the energy from the input source voltage temporarily and then releasing that energy to the output at a different voltage. For all but the lowest power converters, energy is stored into and then released from a magnetic components such as an inductor or transformer. Switch mode conversion is more power efficient (often 75% to 98%) than linear voltage regulation (which dissipates unwanted power as heat). This efficiency is beneficial by reducing loading on the electrical grid or increasing the running time of battery operated devices. During each cycle, when the amount of energy temporarily stored equals the amount of energy released, the converter is considered to be in equilibrium.

In these switch mode converters, energy is periodically stored into and released from a magnetic field in an inductor or transformer, typically in but not limited to the range from about 20 kHz to 20 MHz. By adjusting the duty cycle of the switching from the input source voltage, that is the ratio of on/off time, the amount of power transferred can be controlled. Usually, this is done to control the output voltage, though it could be done to control the input current, the output current, or maintaining a constant power. Transformer based converters may provide isolation between the input and the output, and are also typically used when the output is significantly greater than or significantly less than the input source voltage, or the output voltage polarity is inverted relative to the input source voltage polarity.

In general, the terms "DC to DC converter" and "switch mode converter" each refers to one of these switching converters. Many topologies exist including but not limited to non-isolated buck, boost, buck-boost, SEPIC, and Cuk converters or isolated flyback, forward, push pull, and bridge converters.

Magnetic switch mode converters are usually operated in either one of two modes, according to the current in its magnetic energy storage components (inductors or transformer):
   continuous in which the current fluctuates but never goes down to zero, and
   discontinuous when the current fluctuates during the cycle, going down to zero at or before the end of each cycle Such converters are usually designed to operate in continuous mode at high power, and in discontinuous mode at low power. For system level electrical noise and acoustic noise and other considerations familiar to those skilled in the art, a converter can also be controlled and operated in continuous mode at low power. When the magnetic switch mode converter is operating in equilibrium the magnetic energy storage device which can be either an inductor or a transformer is considered to also be "volt second balanced." Should the amount of energy temporarily stored not equal the amount of energy released for each cycle, an imbalance is considered to have occurred. This imbalance can be exacerbated in higher input voltage applications. One approach for balancing high voltage hysteretic buck regulators in higher input voltage applications is described in "Application Challenges of High Voltage Hysteretic Buck Regulators" by Bob Bell of National Semiconductor of Santa Clara, Calif. (publication date and source unknown). Another example of a buck converter is shown in U.S. Pat. No. 6,747,441.

SUMMARY OF DISCLOSURE

A switch mode converter is configured to convert an input DC source voltage applied at one level at the converter input to an output DC voltage at a second level at the converter output. The DC input source voltage could be implemented in a variety of ways including but not limited to rectifying a 47 Hz to 440 Hz AC input voltage (either with or without a filter capacitor), using a transformer to reduce and/or isolate the AC input voltage and then rectifying (either with or without a filter capacitor), using an AC to DC power supply to create a DC input voltage for downstream DC/DC converters (such as a telecom battery plant or network data center), or the DC input voltage could be a battery voltage or the output voltage of a battery charger. The input source could also be described as a current source but, once all intended and parasitic series and shunt impedances are taken into account, those skilled in the art will recognize that a Thevenin circuit analysis can be performed to represent the input source as a voltage source with specified series impedance. In all cases, the input source voltage is considered DC if variation in the input source voltage is at a significantly lower frequency or slower compared to the switching frequency of the DC-DC converter. For example, if the input DC source varies with the AC mains line frequency at a frequency typically between 47 Hz and 880 Hz, this variation is considered slow compared to typical DC to DC converter switching frequencies of 20 kHz and above.

The converter comprises: an electronic switch (or switches) configured to switch the DC input source voltage on and off during each cycle of a plurality of cycles; energy storage configured to temporarily store energy from the input source voltage when the switch is on, and release energy to the load when the switch is off during each cycle, wherein the input energy stored is equal to the energy released with each cycle and achieves equilibrium when the converter is operating into normal loads; and a novel reset mechanism configured to provide additional reset voltage to ensure sufficient energy is released during each cycle to achieve equilibrium and volt second balance in the magnetic energy storage device when the converter is operating in an overload or output short circuit condition (both being referred to as a "fault condition").

GENERAL DESCRIPTION OF THE DRAWINGS

Referring to the drawings.

Figure 33:
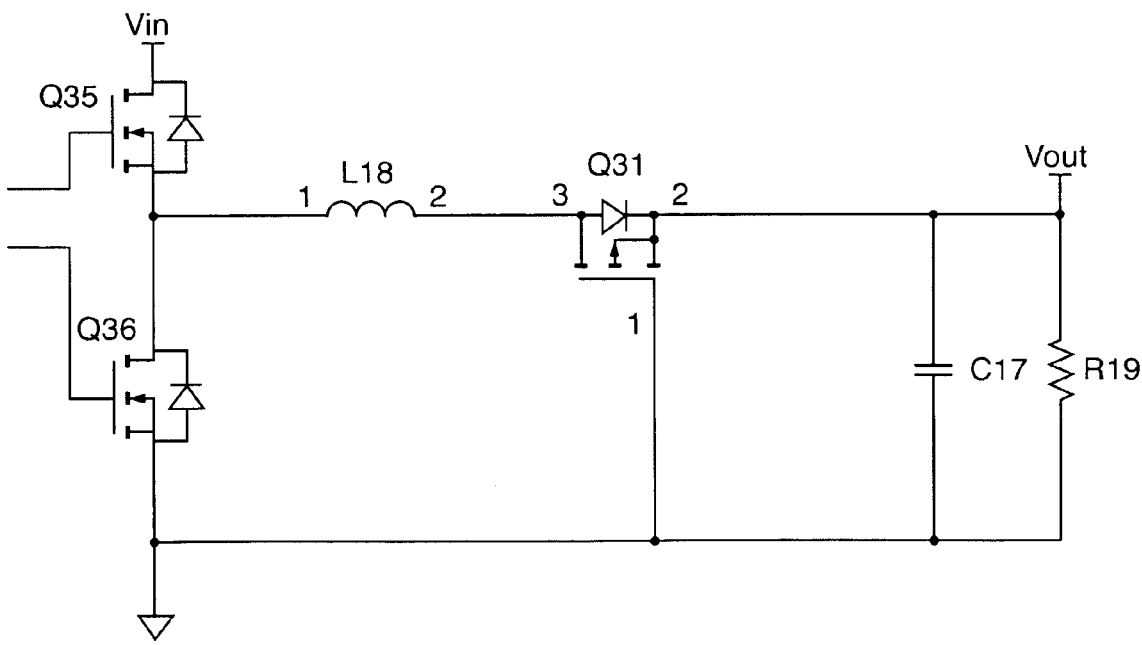
Figure 34:
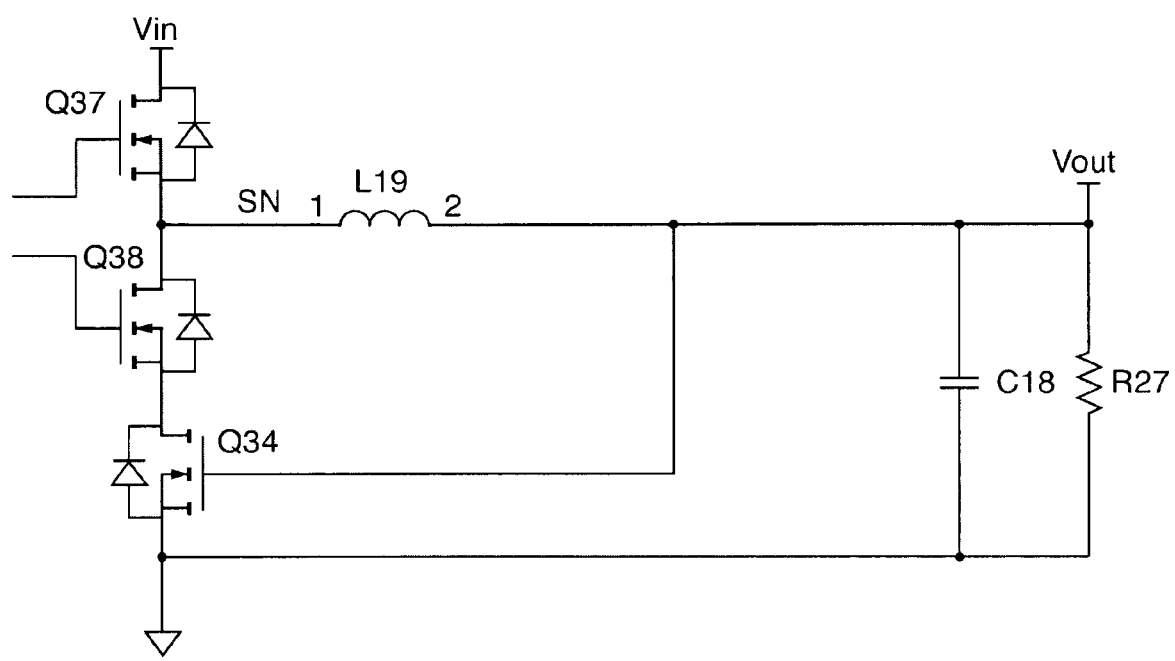

FIG. 33 is a general and simplified schematic drawing showing one embodiment of a synchronous buck converter comprising a reset mechanism including a P-channel MOSFET and reset diode; and FIG. 34 is a general and simplified schematic drawing showing another embodiment of a synchronous buck converter comprising a reset mechanism including a N-channel MOSFET and reset diode in series with a synchronous N-channel MOSFET.

DETAILED DESCRIPTION OF THE DRAWINGS

As mentioned, steady state operation of a switch mode converter requires that, from one switch cycle to the next, there is no net increase or decrease in average net energy stored and released from the energy storage device, which means the converter is operating in equilibrium. Before switch mode converters can be discussed, the basic concept of inductor volt second balance is described. Inductors will be used in the following examples (but the principals here apply to transformers as well). Electronic switches are used to connect and disconnect various voltage sources to the inductor. Electronic switches can be "active" and have a control pin such as the MOSFET, bipolar transistor, or IGBT. Electronic switches can also be "passive", have no control pin, and switch effectively automatically (subject to circuit voltage and current polarities) such as a Schottky diode or PN diode. There are two distinct modes per switching cycle: the ramp up mode (RU) (when the energy from the input source voltage is stored), and the ramp down mode (RD) (when the energy is released). Note that the term "reset" refers specifically to the ramp down mode.

Figure 1:
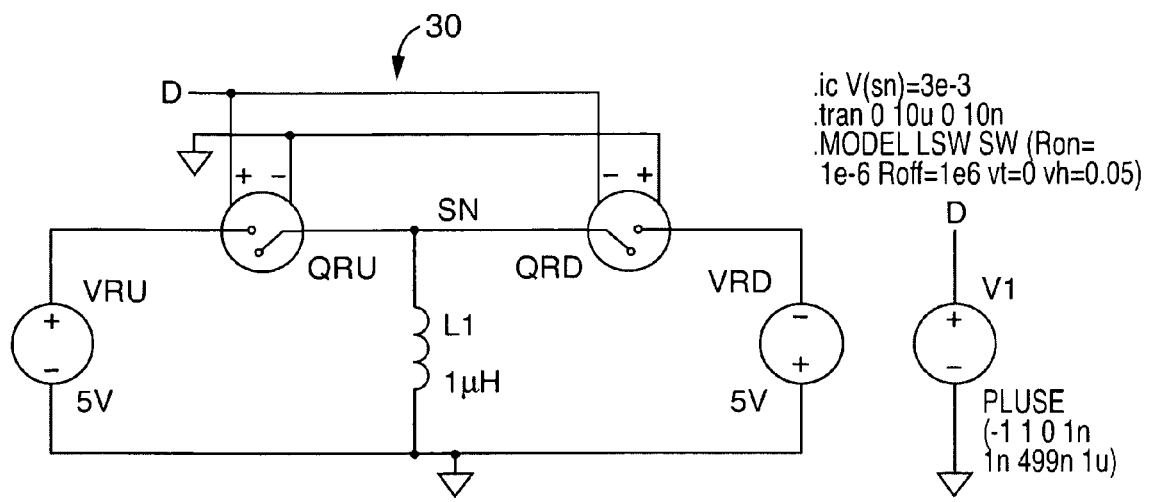
FIG. 1 is a general and simplified schematic diagram showing the basic components of an inductor switch mode converter comprising two active switches, with exemplary operating values to achieve equilibrium.
Figure 2:
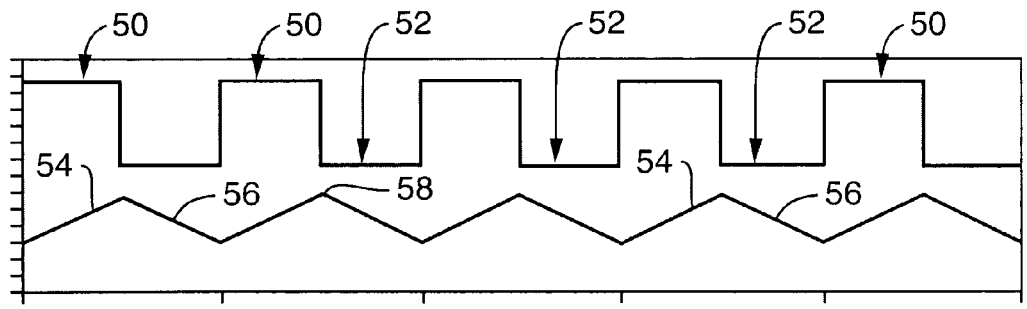
FIG. 2 is a graphical illustration of the volt second response of the converter of FIG. 1 when the converter is operating in equilibrium.
Figure 3:
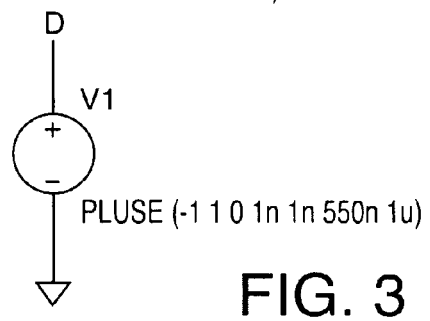
FIG. 3 shows exemplary operating values for the converter shown in FIG. 1 resulting in an unbalanced circuit with ramp up time being excessive for each cycle than required for equilibrium.

FIG. 1 shows a basic inductor volt second balance converter circuit 30 comprising one inductor L, ramp up voltage source $V_{RU}$, ramp down voltage source $V_{RD}$, ramp up active switch $Q_{RU}$, and ramp down active switch $Q_{RD}$. Note the voltage source polarity signs. In general, $V_{RD}$ must effectively have the opposite polarity compared to $V_{RU}$. Equilibrium is assumed and the switching cycle starts with inductor L already carrying a current of three Amps. During the ramp up mode $Q_{RD}$ is turned off and $Q_{RU}$ is turned on for time $t_{RU}$. As shown in FIG. 2, the top graph shows the switching signal for ramp up switch $Q_{RU}$ varying between an on condition 50 and off condition 52 (with ramp down active switch $Q_{RD}$ operating 180° out of phase with this signal). In the bottom graph of FIG. 2, the current flowing though the inductor L, with the current increasing during ramp up, and resetting or decreasing during ramp down as indicated at 54 and 56, and peaking at 58. Using the example of the values shown in FIG. 3, the resulting plotted graphs shown in FIG. 2 indicate that inductor current 54 increases to a peak value 58 of approximately 5.5 A according to the following equation where $i_{RU}$ is the net increase (+2.5 A=5.5 A−3.0 A) in the ramping current during time $t_{RU}$.

$$di = \frac{V}{L} * dt = i_{RU} = \frac{V_{RU}}{L} * t_{RU} \qquad (1)$$

As seen in FIG. 2, during the ramp down mode $Q_{RU}$ is turned off and $Q_{RD}$ is turned on for time $t_{RD}$. Inductor current resets or decreases from 5.5 A back down to the minimum value of 3.0 A according to the following equation where $i_{RD}$ is the net decrease (−2.5 A=3.0 A−5.5 A) in the ramping current during time $t_{RD}$, and can be expressed as follows:

$$di = \frac{V}{L} * dt = i_{RD} = \frac{V_{RD}}{L} * t_{RD} \qquad (2)$$

For equilibrium, the sum of $i_{RU}$ and $i_{RD}$ must be equal to zero.

$$i_{RU} + i_{RD} = 0 \qquad (3)$$

$$i_{RU} = -i_{RD} \qquad (4)$$

These expressions can be rearranged to show that, if ramp up current $i_{RU}$ is equal to reset or ramp down current $i_{RD}$, then there is a relationship between ramp up time $t_{RU}$ and ramp down time $t_{RD}$.

$$\frac{V_{RU}}{L} * t_{RU} = -\frac{V_{RD}}{L} * t_{RD} \qquad (5)$$

Note inductor value L actually drops out of this equation leaving the classic inductor volt-second balance equation.

$$V_{RU} * t_{RU} = -V_{RD} * t_{RD} \qquad (6)$$

This equation can now be solved to calculate the ramp down time $t_{RD}$ required to reset the inductor and achieve volt second balance as a function of ramp up time $t_{RU}$, ramp up voltage $V_{RU}$, and ramp down voltage $V_{RD}$.

$$\frac{V_{RU} = t_{RU}}{-V_{RD}} = t_{RD} \qquad (7)$$

This equation must be satisfied for all switch mode converters operating in equilibrium and is valid for fixed frequency converters, fixed on time variable frequency converters, fixed off time variable frequency converters, isolated and non isolated converters and all converter implementations using active or passive electronic switches.

Figure 4:
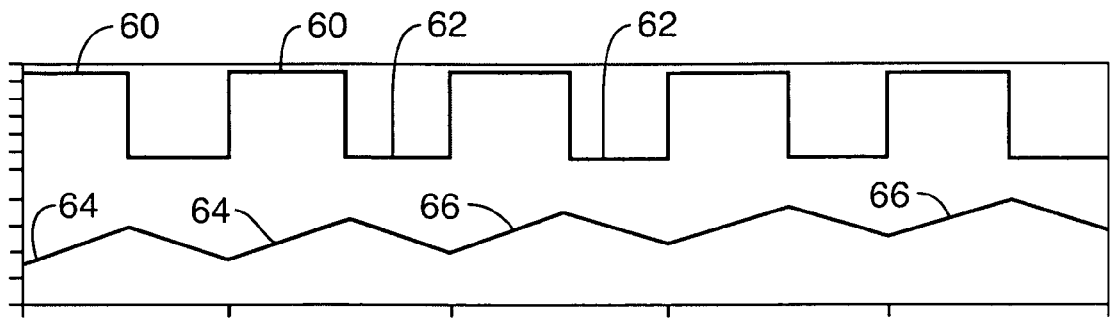
FIG. 4 is a graphical illustration of the volt second response of the converter of FIG. 1 when the converter operates at the values indicated in FIG. 3, resulting in the average inductor current increasing from one cycle to the next.
Figure 5:
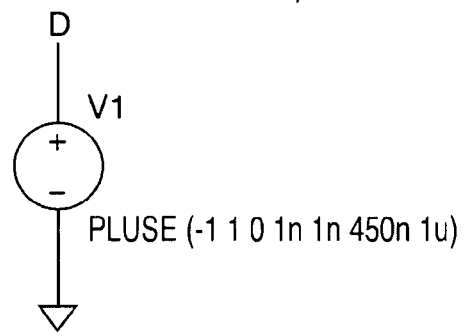
FIG. 5 shows exemplary operating values for the converter shown in FIG. 1 resulting in an unbalanced circuit with ramp down time being excessive for each cycle than required for equilibrium.
Figure 6:
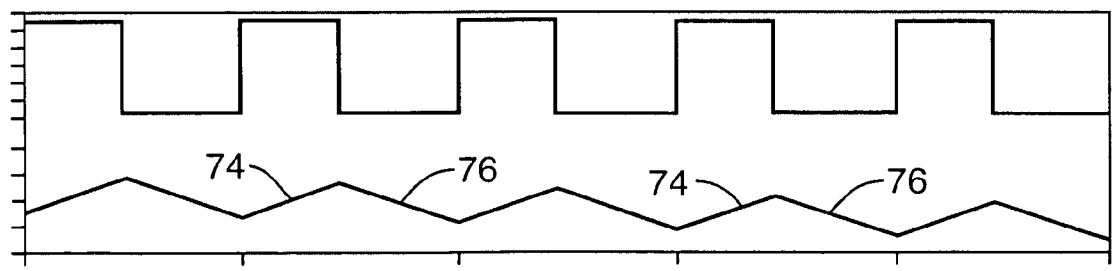
FIG. 6 is a graphical illustration of the volt second response of the converter of FIG. 1 when the converter operates at the values indicated in FIG. 5, resulting in the average inductor current decreasing form one cycle to the next.

If the ramp up times and ramp down times are not set properly, inductor current at the end of each cycle will be higher (or lower) than at the beginning of the cycle which means the circuit is not in equilibrium. Using the example of the values shown in FIG. 3 for the FIG. 2 circuit, the resulting plotted graphs show in FIG. 4 shows an unbalanced circuit with ramp up time indicated at 60 set longer than the equilibrium value (with the corresponding ramp down time indicated at 62 set shorter than the equilibrium). Note the average inductor current has not been completely reset and increases from one cycle to the next (since the current is increasing for a longer period of the cycle as indicated at 64 and 66). In a similar manner using the example of the values shown in FIG. 5 for the FIG. 2 circuit, the resulting plotted graphs shown in FIG. 6 shows an unbalanced circuit with the ramp up time set shorter than the equilibrium value. In this case the average inductor current decreases from one cycle to the next as can be seen at 74 and 76.

Figure 7:
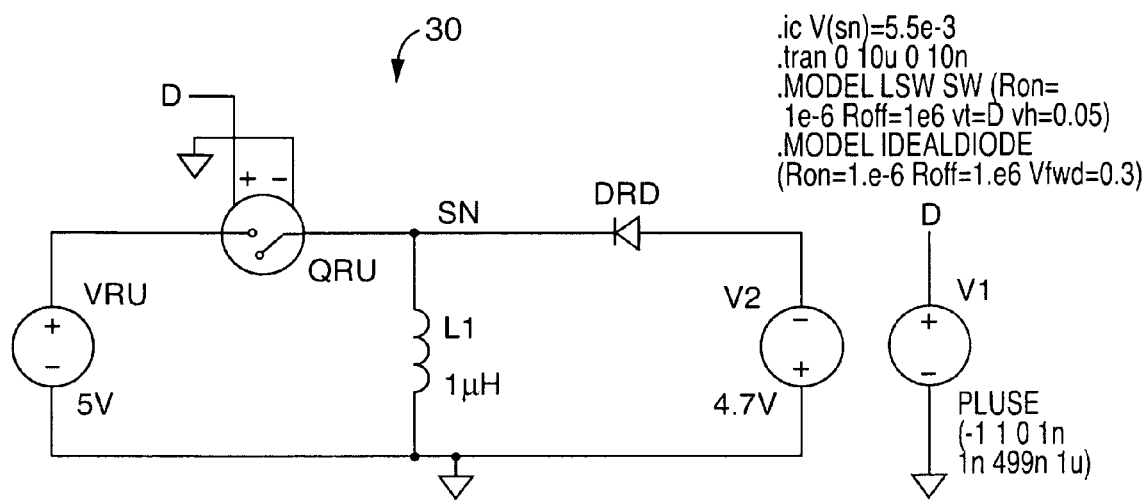
FIG. 7 is a general and simplified schematic showing the basic components of an alternative inductor switch mode converter comprising one active switch and one passive diode switch, with exemplary operating values to achieve equilibrium.
Figure 8:
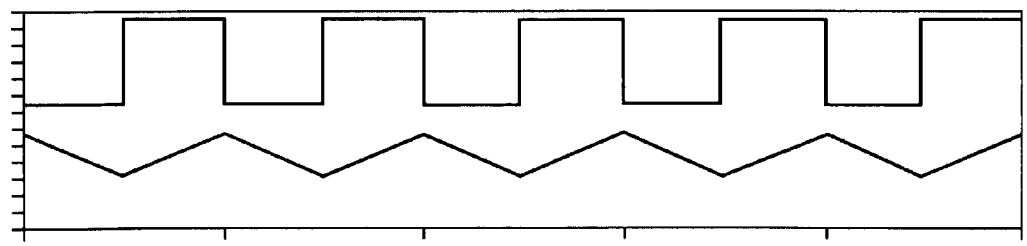
FIG. 8 is a graphical illustration of the volt second response of the converter of FIG. 7 when the converter is operating in equilibrium.

FIG. 7 shows essentially the same circuit where active switch $Q_{RD}$ has been replaced with passive switch diode $D_{RD}$. The ramp down voltage $V_{RD}$ is now effectively the sum of voltage source V2 and diode forward voltage (in the example shown, $V_{DRD}$=−(4.7V+0.3V)=−5V) which gives the same result. The diode forward voltage drop (typically 0.3V to 0.7V) will play a very important inductor reset and voltage second balance role in all converters with passive switch modes of operation. Note the response of the circuit when operating in equilibrium shown in FIG. 8 is similar to the response shown in FIG. 2.

The next step is to demonstrate volt second balance with an actual switch mode converter. A non-synchronous continuous mode buck converter will be used as an example. Non-synchronous means that a passive switch (freewheeling diode) will be used to provide a current path during the reset or ramp down mode. Continuous conduction mode (CCM) means the inductor current is always either ramping up or ramping down. Frequency will be fixed at a constant value fs which has a fixed period T. With fixed frequency CCM converters, the reset or ramp down time $t_{RDffCCM}$ can be calculated from ramp up time $t_{RU}$ and period T as follows:

$$t_{RDffCCM} = T - t_{RU} \tag{8}$$

Figure 9:
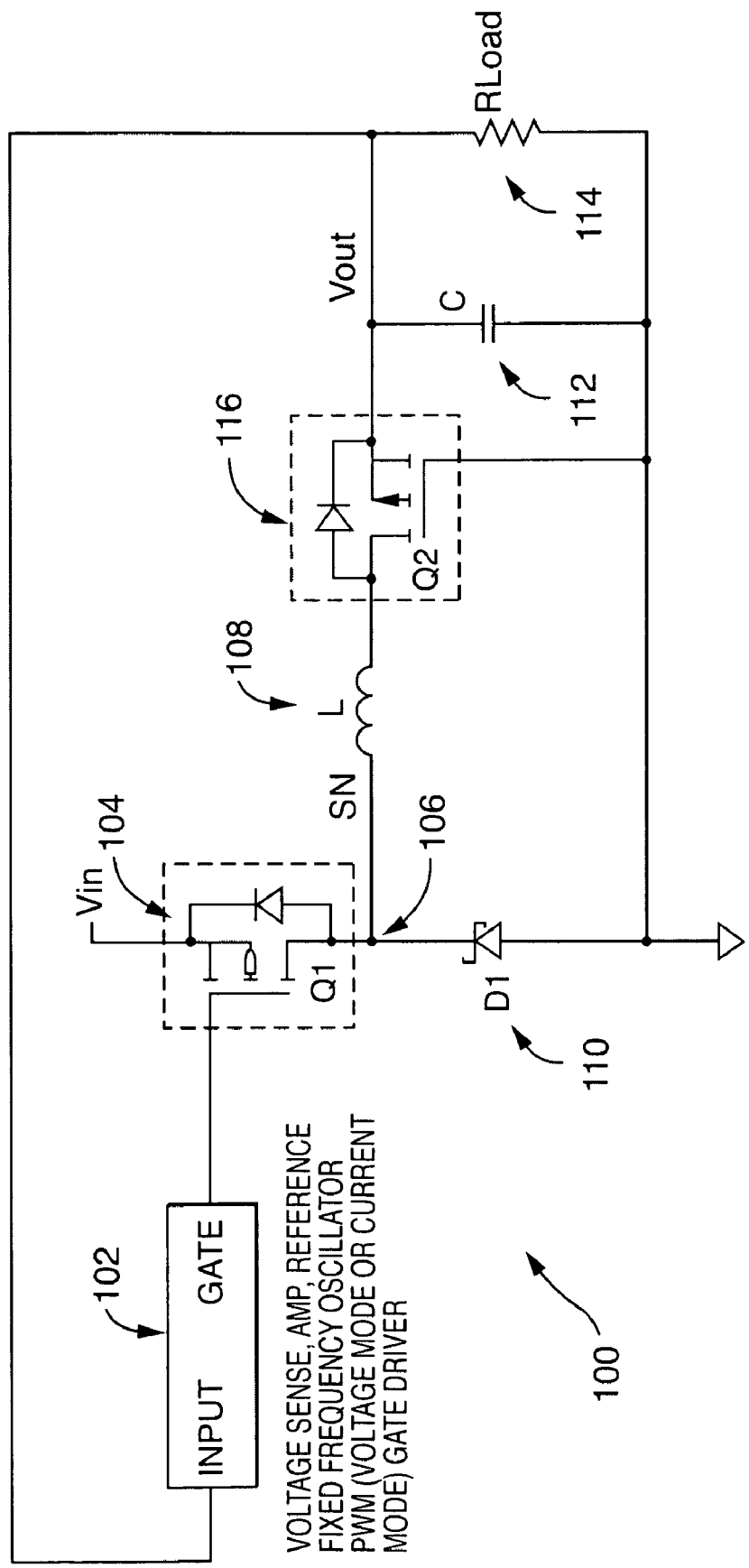
FIG. 9 is a general and simplified schematic showing the basic components of one embodiment of a non-synchronous, continuous mode, buck converter comprising a reset mechanism configured to release energy during each cycle to achieve equilibrium when the converter is operating in an overload condition.

In order to illustrate the principles of providing an additional reset mechanism to ensure that energy that can be released during each cycle to achieve equilibrium when the converter is operating in overload condition, reference is made to the example of the non-synchronous continuous mode buck converter in FIG. 9. As shown in FIG. 9, the converter 100 includes a control circuit 102. Control circuit 102 provides an output to the power switch 104 for turning the switch on and off through multiple cycles. The control is usually configured to control the duty cycle of pulses provided to the power switch 104, which is shown in the example as a P-type MOSFET device, but can be any other type of switching device such as other types of MOSFETs, bipolar transistors, IGBTs and the like, as will become more evident hereafter. In order to turn on the power switch 104, the gate must be pulled below the MOSFET Source pin. When the voltage at the node 106 (connected to the source of the MOSFET switch) is pulled to the same level of Vin, current through the inductor 108 increases. In order to turn off the power switch 104, the gate of the MOSFET device is pulled high. However, the current through the inductor should start decreasing from the level it reached at the time the switch was open. This is possible because the inductor will induce a voltage on node 106 below ground so that current flow through the inductor 108 will continue through the freewheeling diode 110. If discontinuous mode is allowed, at very light or no load conditions, the inductor current will approach approximately zero, the node 106 voltage will ring (fluctuate up and down) until the next switching cycle, and the circuit is said to be discontinuous. When an adequate minimum load exists or the converter is forced to operate in continuous mode, however, the inductor current will include a DC bias, upon which the cyclic varying current sits. During conditions of equilibrium, the inductor average current does not change from one cycle to the next so long as converter is operating in equilibrium. Inductor voltage is simply the difference between $V_{SN}$ (switch node voltage 106) and $V_{OUT}$ (output voltage). In the example shown, note that $V_{SN}$ reaches a max value of approximately 10V during ramp up and a minimum value of approximately −0.3V (equal to diode forward voltage $V_F$) during ramp down. The current flow from the inductor 108 provides enough energy to charge the output capacitor 112 (connected from the inductor 108 to ground) and maintain the required load current in load resistor $R_{load}$ 114. The output DC voltage across the capacitor can be measured and is applied across $R_{load}$ 114 (as it should be in equilibrium) with a value of +5V.

The following equations show the effective values for ramp up $V_{RU}$ and reset or ramp down voltages $V_{RD}$. Note that the ramp up voltage is the difference between input and output voltage while the ramp down voltage is the sum of diode forward voltage and output voltage.

$$V_{RU} = V_{SN} - V_{OUT} = V_{IN} - V_{OUT} = +10V - 5V = +5V \tag{9}$$

$$V_{RD} = V_{SN} - V_{OUT} = V_F - V_{OUT} = -0.3V - 5V = -5.3V \tag{10}$$

The volt second balance equation for fixed frequency CCM buck converters can be simplied as follows. The equation for $t_{RDffCCM}$ is substituted in and then solved:

$$\frac{V_{RU} * t_{RUffCCM}}{-V_{RD}} = t_{RDffCCM} = T - t_{RUffCCM} \tag{11}$$

$$t_{RUffCCM} * \left(1 - \frac{V_{RU}}{V_{RD}}\right) = T \tag{12}$$

$$t_{RUffCCM} * \frac{V_{RD} - V_{RU}}{V_{RD}} = T \tag{13}$$

$$t_{RUffCCM} = \frac{T * V_{RD}}{V_{RD} - V_{RU}} \tag{14}$$

Substituting in for $V_{RU}$ and $V_{RD}$:

$$t_{RUffCCM} = \frac{T * (-V_F - V_{OUT})}{(-V_F - V_{OUT}) - [(V)]_{IN} - V_{OUT})} \tag{15}$$

$$t_{RUffCCM} = \frac{-T * (V_F + V_{OUT})}{-V_F - V_{OUT} - V_{IN} + V_{OUT}} \tag{16}$$

The output voltage term drops out of the denominator and the minus signs all cancel leaving the following defining equation for ramp up time $T_{RUffCCM}$ for fixed frequency continuous mode buck converters.

$$t_{RUffCCM} = \frac{T * (V_F + V_{OUT})}{V_F + V_{IN}} \tag{17}$$

This equation is valid for all buck converter modes of operation including the fault condition occurring when the output is physically short circuited which means Vout is effectively equal to zero and the short circuit ramp up time $t_{RUffCCMsc}$ simplifies to the following short circuit equation:

$$t_{RUffCCM_{sc}} = \frac{T * V_F}{V_F + V_{IN}} \tag{18}$$

Input voltage $V_{IN}$ is usually specified by the application and is not a variable the circuit designer has control over. $V_F$ is determined by the diode part number selected for D1 and there may be circuit or power dissipation limitations restricting the maximum value of the forward voltage. Period T is determined by the circuit designer. For some circuit implementations there will be a minimum possible on time (ramp up time) as a function of period T such that the circuit is physically not capable of satisfying this equation and in this case the inductor is not completely reset, volt-second balance cannot be maintained, the circuit is no longer in equilibrium, and inductor current rises until limited by a fuse or catastrophic component failure.

It is desirable to introduce a new term $V_{F2}$ that appears only in the following short circuit equation, which gives the designer another variable to optimize to reset the inductor for volt second balance under short circuit operation that has effectively no effect on circuit operation when the output is not short circuited:

$$t'_{RU\!f\!fCCM_{sc}} = \frac{T*[(V)]_F + V_{F2})}{V_F + V_{F2} + V_{IN}} \quad (19)$$

Accordingly, further describing the exemplary converter of FIG. 9, in addition to the basic components of the switch $Q_1$, diode $D_1$, shown as a freewheeling Schottky diode, output inductor L, output capacitor C, and load resistor $R_{Load}$, the converter also includes a reset mechanism 116 (shown as MOSFET Q2 configured and connected to operate as an electronic switch with parallel diode D) for providing an additional source of reset voltage only when the converter is operating in overload condition. The reset mechanism shown as additional transistor switch Q2 ensures that inductor L will always be completely reset and operate with volt second balance and achieve equilibrium even when the load is short circuited. Note that both transistors Q1 and Q2 (labeled 104 and 116) are shown as P-channel MOSFET transistors with the parasitic internal PN junction body diode shown explicitly for each. As shown in FIG. 9 the reset diode D is connected in the embodiment of FIG. 9 between the source and drain of the MOSFET Q2. In general, when the MOSFET Q2 is on, most of the current flows through the MOSFET Q2 between the source and drain through a path of much lower resistance (almost a short circuit) than that of the reset diode D. However, when the MOSFET Q2 is turned off, all of the current will flow through the reset diode D, creating a voltage drop across the diode. Transistor Q1 can generally be implemented with other types of transistors including MOSFETs and bipolar transistors, but the P-channel MOSFET shown for transistor Q2 is presently the simplest and lowest cost implementation for the techniques described in this patent (other types of electronic switches can be used including but not limited to N-channel MOSFETs, PNP and NPN bipolar transistors, and N channel and P channel IGBTs). Forward voltage drop of PN junction diodes (typically 0.7V) are always significantly higher than Schottky diodes (typically 0.3V) rated for comparable currents. Those skilled in the art are familiar with typical implementations of voltage mode or current mode fixed frequency Pulse Width Modulators and gate drivers so, for clarity, these circuits are not shown in FIG. 9.

Figure 10:
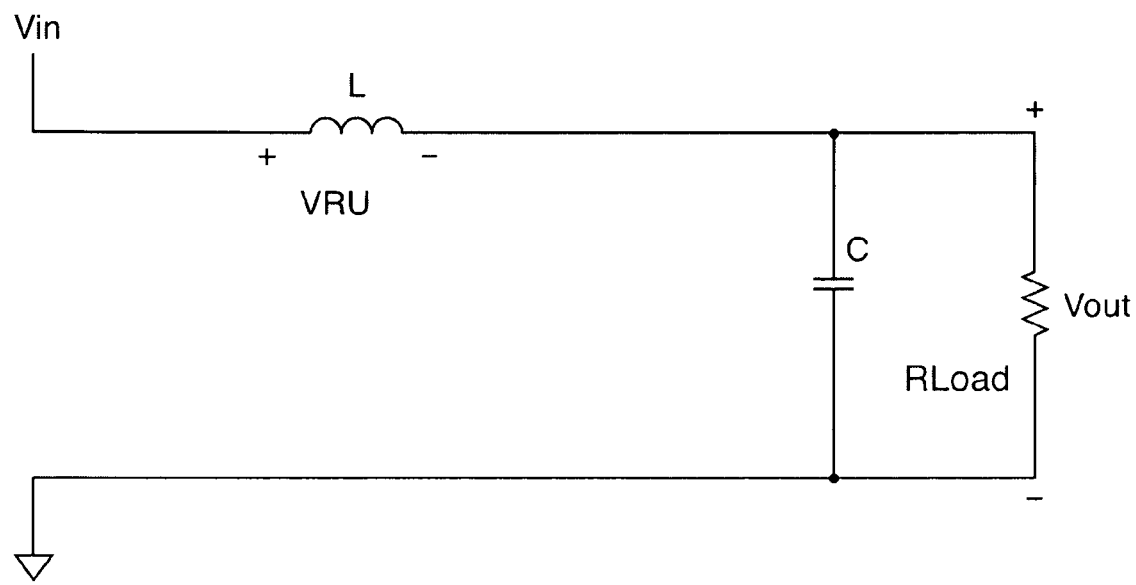
FIG. 10 is a simplified representation of the FIG. 9 schematic when the switch Q1 is turned on and energy is being temporarily transferred into energy storage.
Figure 11:
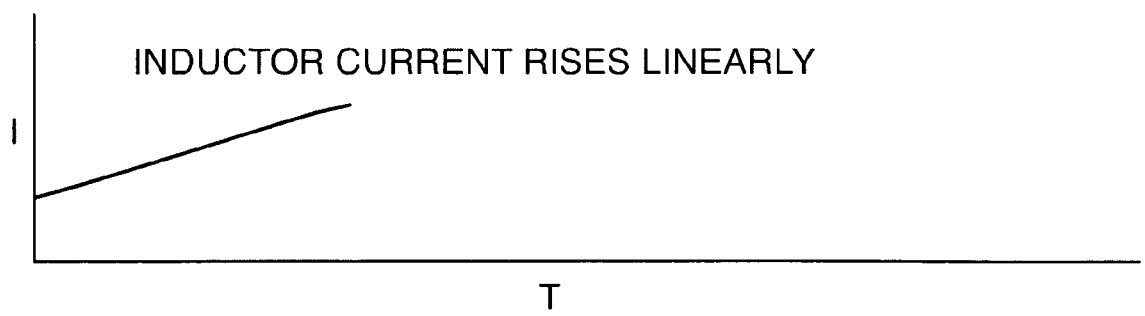
FIG. 11 is a graphical representation showing the current in the inductor shown in FIG. 9 when energy is being transferred into the inductor.
Figure 12:
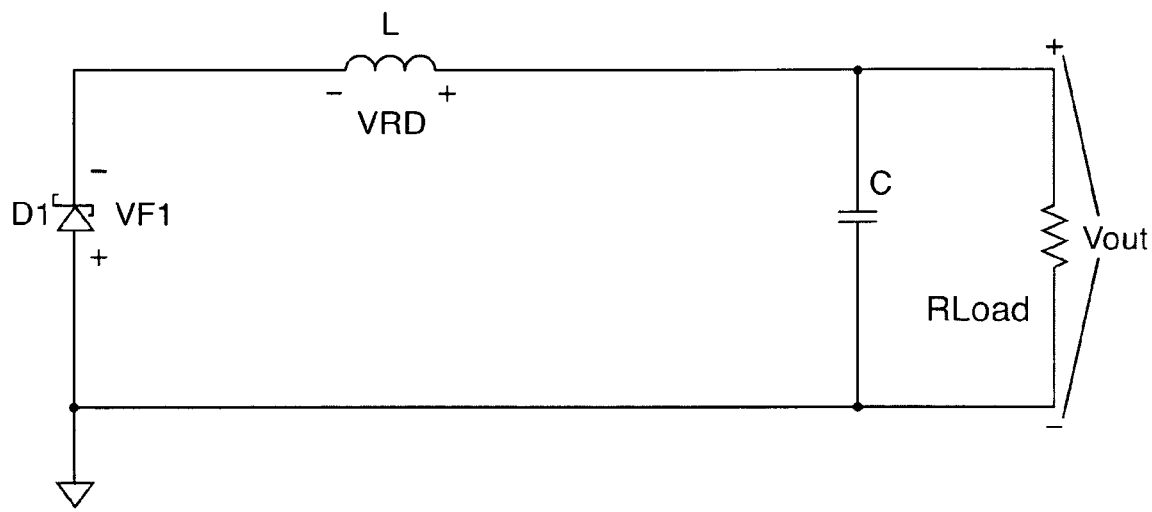
FIG. 12 is a simplified representation of the FIG. 9 schematic when the switch Q1 is turned off and the freewheeling diode D1 is conducting.

In operation, each CCM buck converter cycle of the FIG. 9 embodiment includes two different modes best illustrated with two simplified circuits shown in FIGS. 10 and 12. The first mode results when transistor Q1 is turned on, and is shown in simplified form in FIG. 10. During normal operation (when output is not shorted) transistor Q2 is also turned on so both transistors Q1 and Q2 are replaced with short circuits (wires). In a properly designed buck converter, the output voltage does not significantly change over one switching cycle (ripple voltage is small and negligible) and inductor current simply ramps up linearly as long as transistor Q1 is turned on as see in FIG. 11. The ramp up voltage $V_{RU}$ across inductor L is the difference between $V_{IN}$ and $V_{OUT}$:

$$V_{RU} = V_{IN} - V_{OUT} \quad (20)$$

Figure 13:
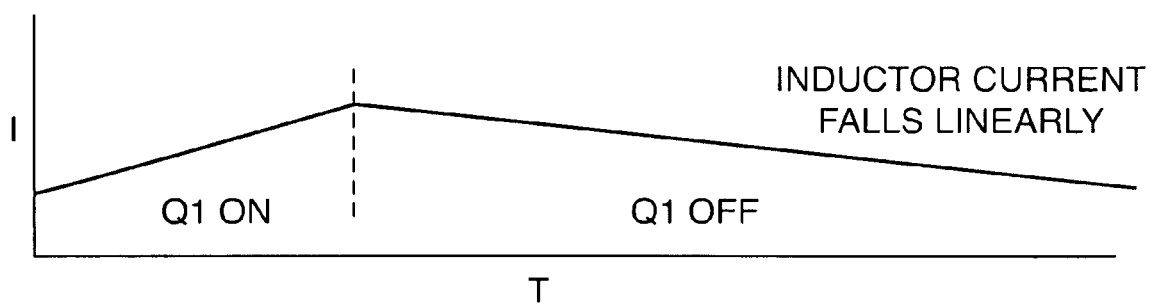
FIG. 13 is a graphical representation showing the current in the inductor shown in FIG. 9 when the switch Q1 is first turned on, then off and the freewheeling diode D1 is conducting.

The second mode illustrated in FIG. 12 results when transistor Q1 is turned off. During normal operation (when output is not shorted) transistor Q2 is still turned on so transistor Q2 is still replaced with a short circuit (wire). Freewheeling diode D1 conducts current and inductor current simply resets and ramps down linearly as long as transistor Q1 is turned off as shown in FIG. 13. Note the voltage VF1 shown across diode D1. The reset or ramp down voltage $V_{RD}$ across L is the sum of $V_{Out}$ and diode voltage $V_{F1}$:

$$V_{RD} = V_{Out} + V_{F1} \quad (21)$$

Figure 14:
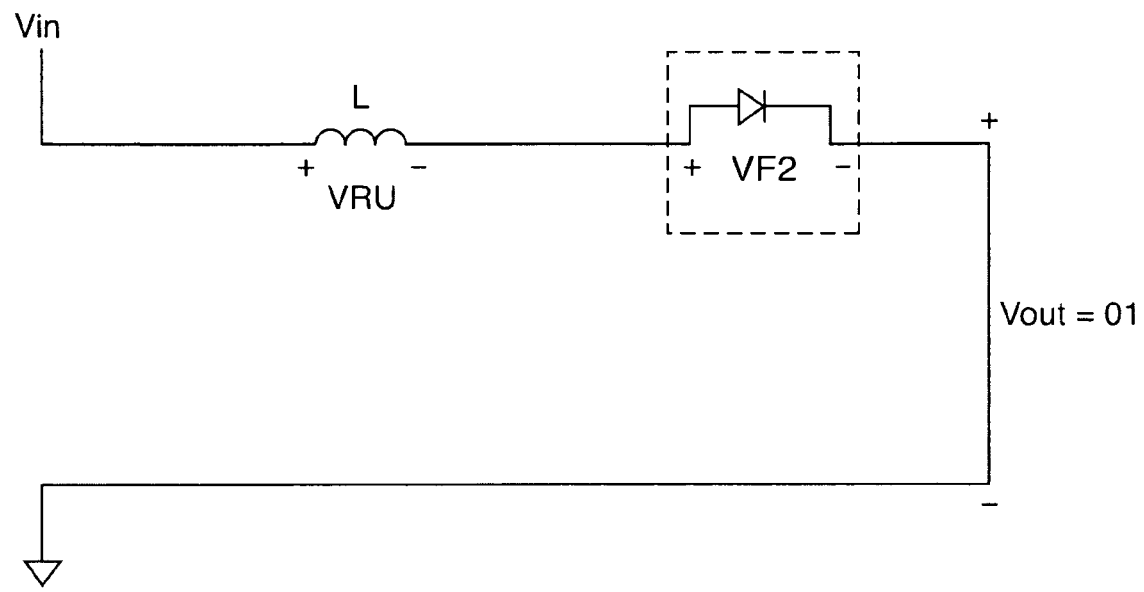
FIG. 14 is a simplified representation of the FIG. 9 schematic when the switch Q1 is turned on and the output is short circuited.
Figure 15:
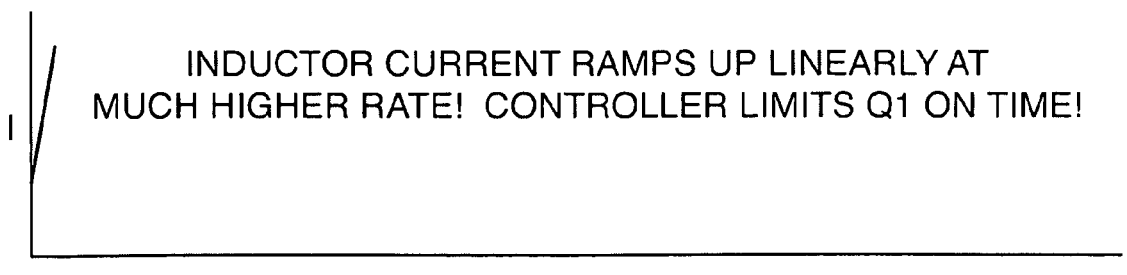
FIG. 15 is a graphical representation of the inductor current versus time when the output is short circuited under the conditions shown in FIG. 14.
Figure 16:
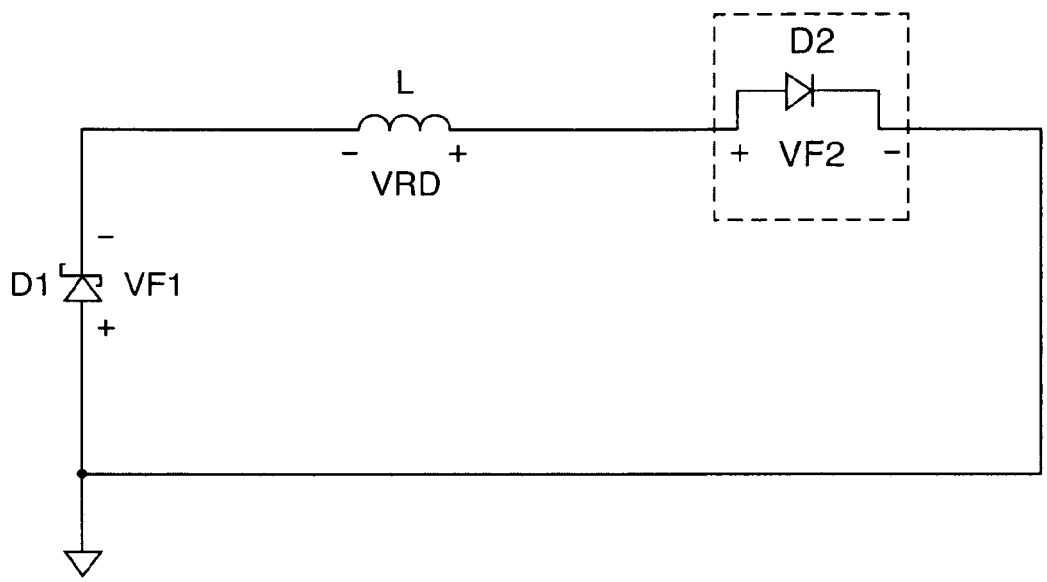
FIG. 16 is a simplified representation of the FIG. 9 schematic when the switch Q1 is turned off and the output is short circuited.

The same analysis can be performed under output short circuit conditions. When the output is shorted as see in FIG. 14, the P-channel MOSFET Q2 is turned off which means current flows through the internal PN junction body diode and develops the typical diode voltage drop (0.7V). Ramp up voltage, the difference between input voltage and diode voltage VF2 is significantly higher than the ramp up voltage in normal operation. Inductor current rises sharply. The controller turns off transistor Q1 as quickly as possible but there is always a minimum on time.

$$V_{RU} = V_{IN} - V_{F2} \quad (22)$$

Figure 17:
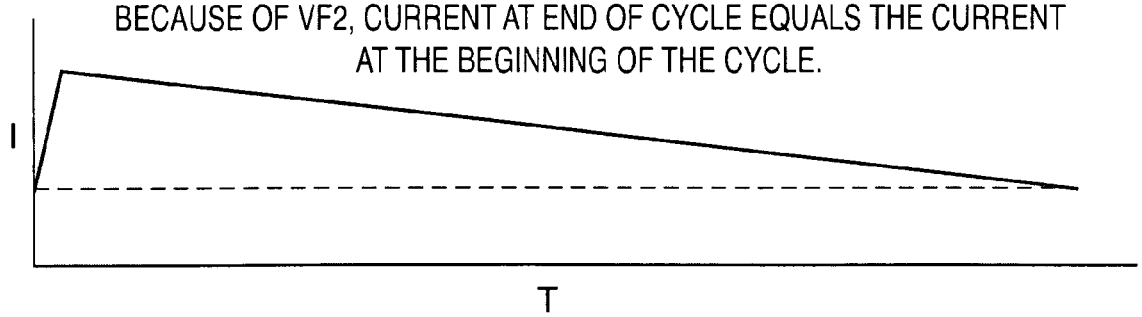
FIG. 17 is a graphical representation of the inductor current versus time during when the output is short circuited under the conditions shown in FIGS. 14 and 16.

When transistor Q1 is turned off during short circuit operation, transistor Q2 turns off so diode D2 and freewheeling diode D1 both conduct current and inductor current ramps down linearly as illustrated in FIG. 17. Note the voltage VF1 (300 mV typically) shown across diode D1 and the higher voltage VF2 (700 mV typically) across diode D2. The reset or ramp down voltage $V_{RD}$ across inductor L is the sum of diode voltages $V_{F1}$ and $V_{F2}$. The short circuited ramp down slope is not as steep compared to normal operation but the slope is still steep enough to ensure proper inductor reset, volt second balance, and equilibrium.

$$V_{RD} = V_{F1} + V_{F1} \quad (23)$$

Figure 18:
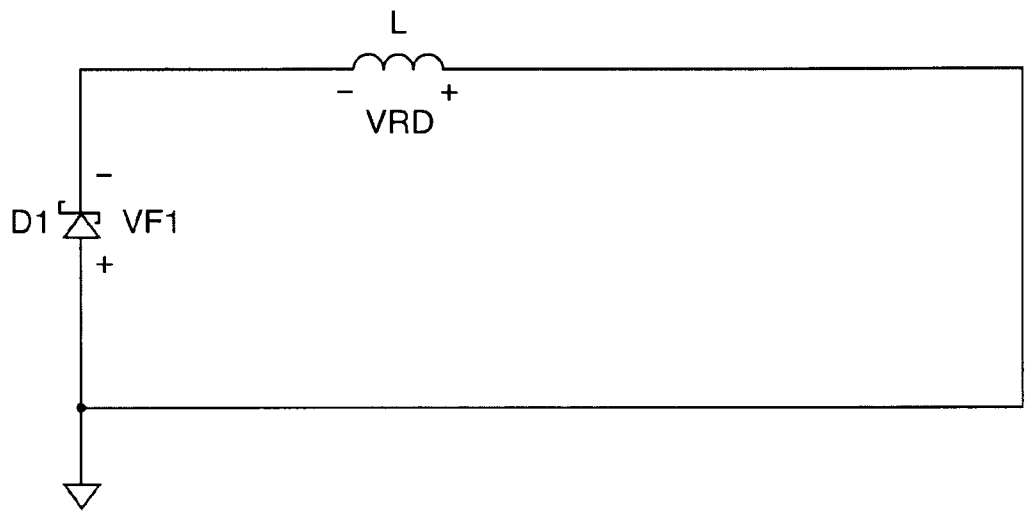
FIG. 18 is a simplified representation of the FIG. 9 schematic when the switch Q1 is turned off and the output is short circuited and there is no reset switch Q2 to ensure inductor reset.
Figure 19:
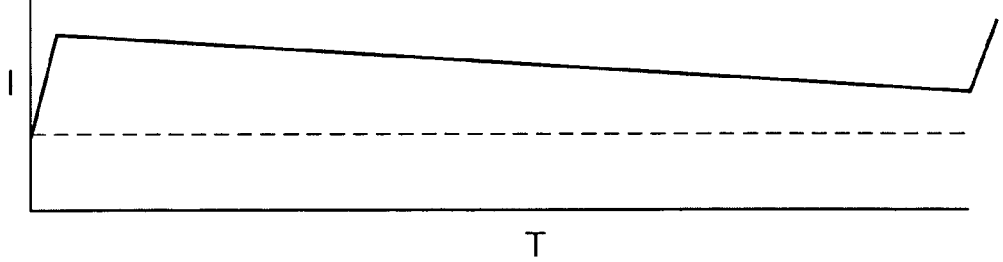
FIG. 19 is a graphical representation of the inductor current versus time during when the output is short circuited under the conditions shown in FIG. 18.
Figure 20:
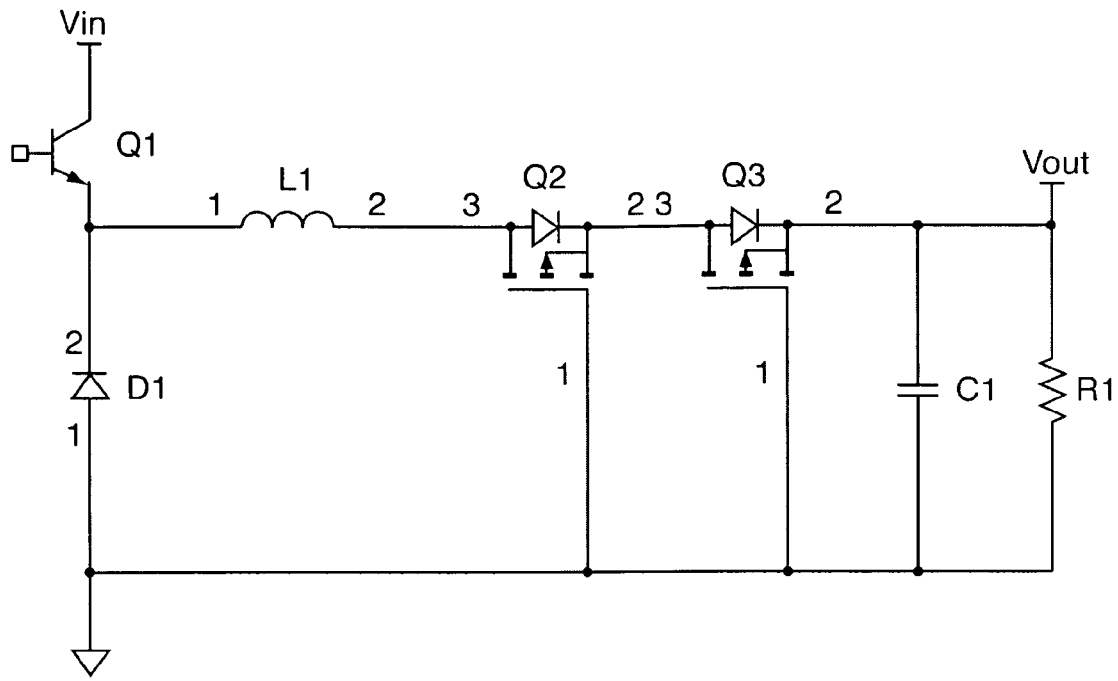
FIG. 20 is a general, simplified schematic drawing showing one embodiment of a non-synchronous, buck converter comprising a reset mechanism configured to increase the reset voltage compared to a single reset diode shown in FIG. 9.
Figure 21:
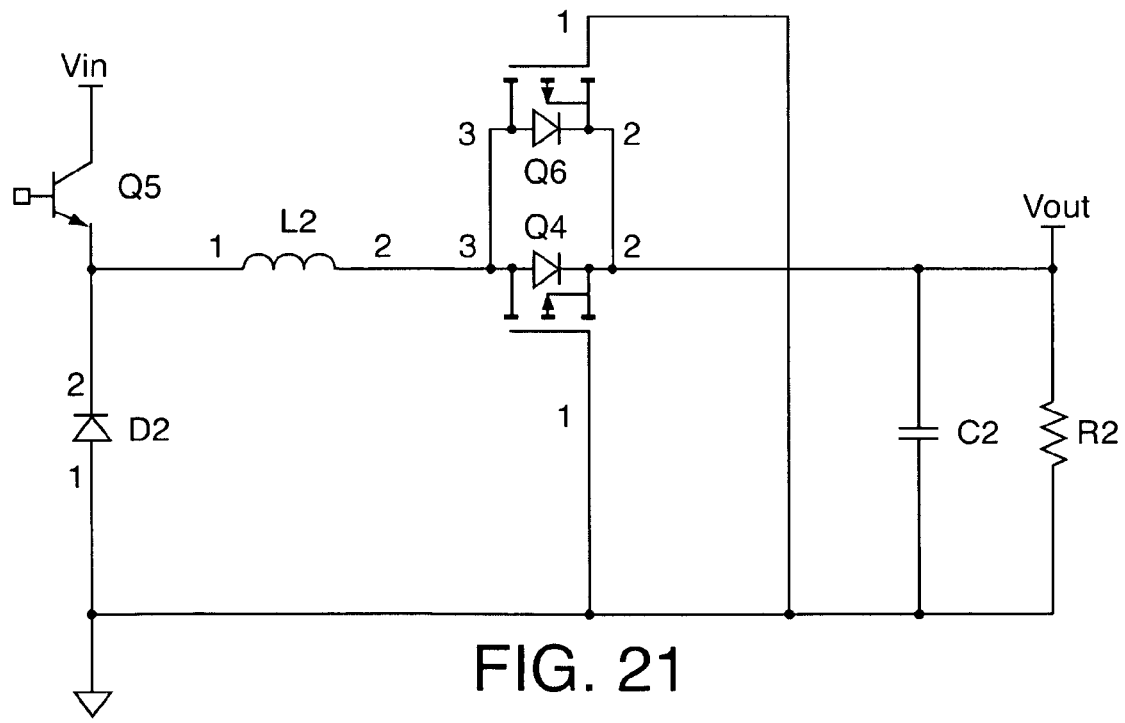
FIG. 21 is a general and simplified schematic drawing showing another embodiment of a non-synchronous, buck converter comprising a reset mechanism configured to increase the current capability compared to a single reset diode shown in FIG. 9.

When transistor Q1 is turned off during short circuit operation with no volt second balance transistor Q2, freewheeling diode D1 conducts current and inductor current slowly ramps down linearly at a much lower rate as seen in FIGS. 18 and 19. The reset or ramp down voltage $V_{RD}$ across inductor L is simply the diode voltage $V_{F1}$ which will not be high enough to reset the inductor if the minimum on time is too long. Thus, $$V_{RD} = V_{F1} \quad (24)$$

Various modifications and additional embodiments are described in connection with the remaining FIGS. 20-34, including additional implementations of the reset mechanism, as well as using a reset mechanism in other types of converters in order to reset those converters during fault conditions.

The reset mechanism can include two or more MOSFETs and reset diodes, connected in series so as to increase the reset voltage. For example, in FIG. 20 the reset mechanism includes two P-channel MOSFETs Q2 and Q3 and two reset diodes D2 and D3, with the reset diode D2 connected between the source and drain of MOSFET Q2, and the reset diode D3 connected between the source and drain of MOSFET Q3. The MOSFETs Q2 and Q3, and the corresponding reset diodes D2 and D3, are connected in series so as to double the reset voltage from that shown in FIG. 9. During normal operation the MOSFETs Q2 and Q3 will be on, and will be conducting to provide a conductive path with minimal resistance (effectively a shorted current path through both MOSFETs between the source and the drain of each MOSFET). During fault conditions however, both MOSFETs will turn off, and both diodes will then be conductive providing a voltage drop equal to two diode drops which are additive. The voltage drop can be further increased by additional MOSFETs and reset diodes in series.

In order to increase the current capability of the reset mechanism, the reset mechanism can include two or more MOSFETs and corresponding reset diodes connected in parallel. By way of example, the configuration of FIG. 21 can be used wherein the MOSFETs Q4 and Q6 and the corresponding reset diodes D4 and D6 are connected in parallel with one another. In this embodiment, during normal operation the MOSFETs Q4 and Q6 will be on in a conductive state so as to provide two parallel paths, each of minimal resistance. During fault conditions, however, both MOSFETs Q4 and Q6 will turn off, and both diodes will then be conductive providing current through each diode. The diodes are connected in parallel, so the reset voltage will remain equal to one diode drop, but the additional conductive diode will provide an additional source of current for the reset mechanism.

Figure 22:
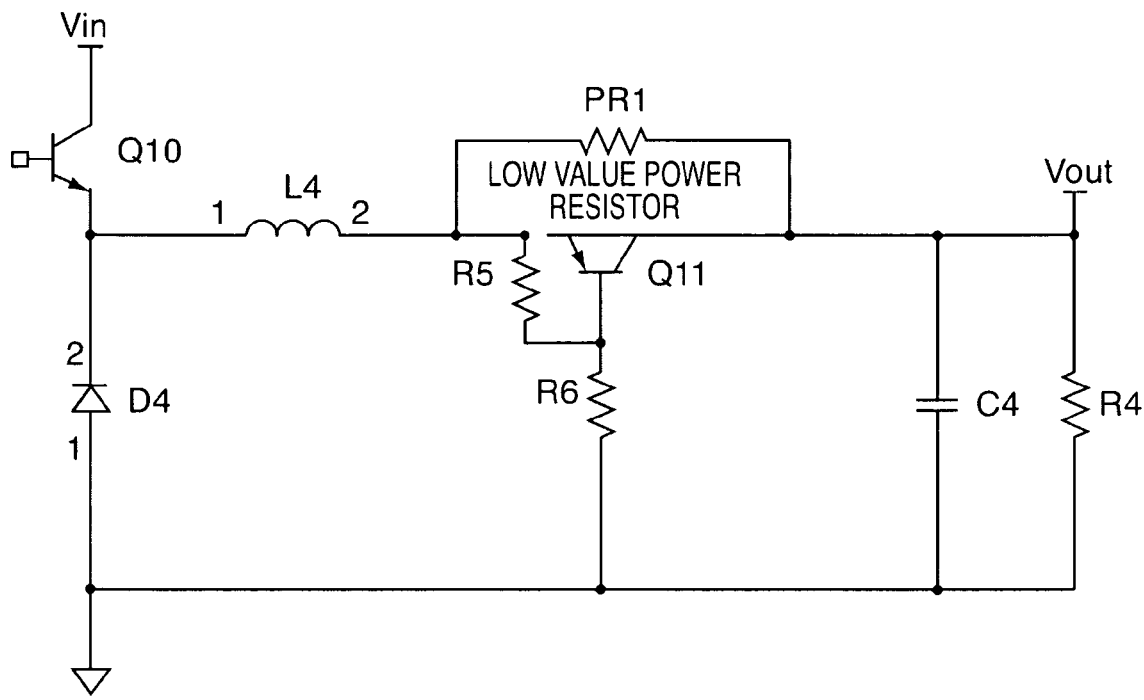
FIG. 22 is a general and simplified schematic drawing showing of yet another embodiment of a non-synchronous, buck converter comprising a reset mechanism including a PNP bipolar transistor and a power resistor.

It should be appreciated that the reset mechanism can include other types of transistors besides MOSFETs. FIG. 22 for example shows the reset mechanism as including a PNP bipolar transistor Q11. A bias resistor R5 is connected between the emitter and base of the bipolar transistor Q11, while the base is connected through bias resistor R6 to system ground. A low value power resistor PR1 replaces the reset diode. During normal operation the resistors R5 and R6 provide the proper bias voltage so that the bipolar transistor is in an on state conducting and providing the current path of minimal resistance. However, during fault conditions, the bipolar transistor Q11 will stop conducting and the current will pass through the low value power resistor PR1 providing the voltage drop for the reset mechanism.

Figure 23:
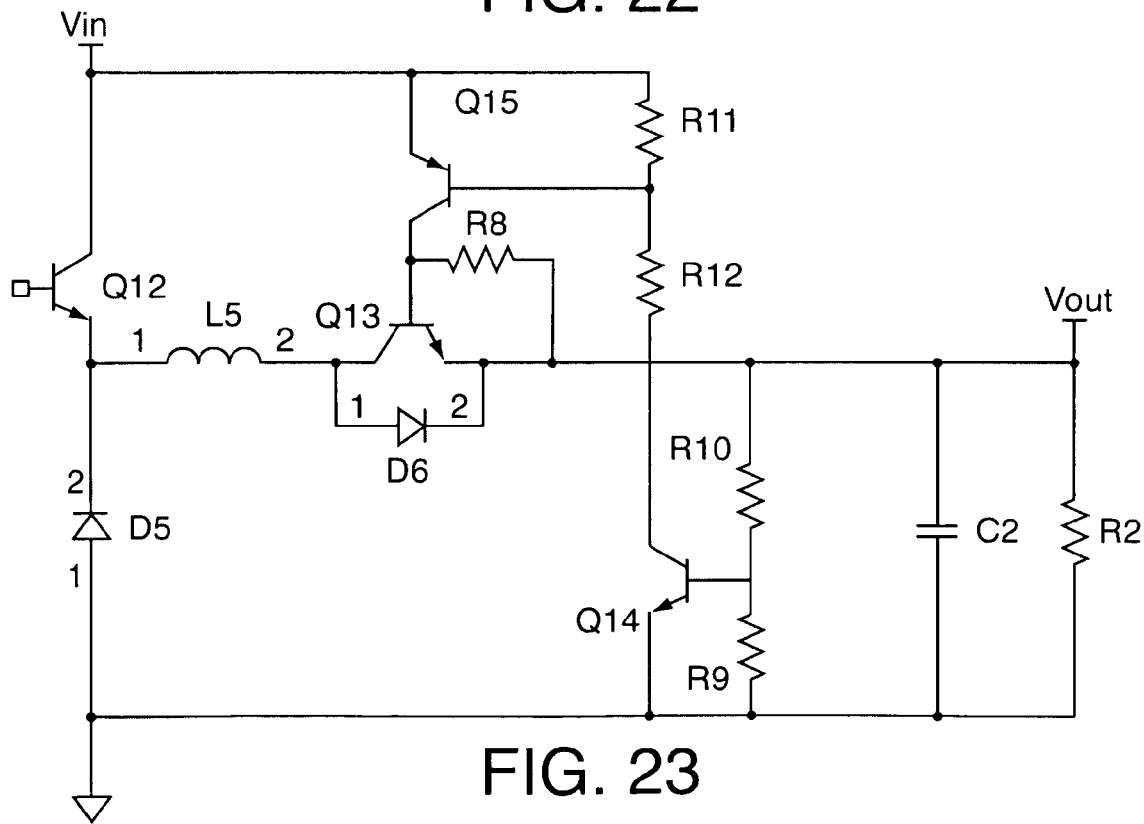
FIG. 23 is a general and simplified schematic drawing showing still another embodiment of a non-synchronous, buck converter comprising a reset mechanism including a NPN bipolar transistor and a diode.

FIG. 23 shows another example of a reset mechanism which employs another type of transistor besides a MOSFET. In this embodiment the reset mechanism includes a NPN bipolar transistor Q13, and reset diode D6 connected between collector and emitter of the transistor. The base of transistor Q13 is connected to additional circuitry to provide level shift and to turn transistor Q13 on during normal conditions and off during fault conditions. This additional circuitry includes transistors Q14 and Q15, and resistors R8, R9, R10, R11 and R12. Transistor Q13 is typically a power transistor, while transistors Q14 and 15 are typically small signal transistors. Resistors R8, R9, R10, R11 and R12 are typically small, low power resistors for properly biasing transistors Q13, Q14 and Q15. During normal operations the transistor Q13 will provide the low resistance current path through the transistor, while during fault conditions, the transistor Q13 will turn off, and current will flow through diode D6 so as to provide a reset voltage equal to the voltage diode drop.

Figure 24:
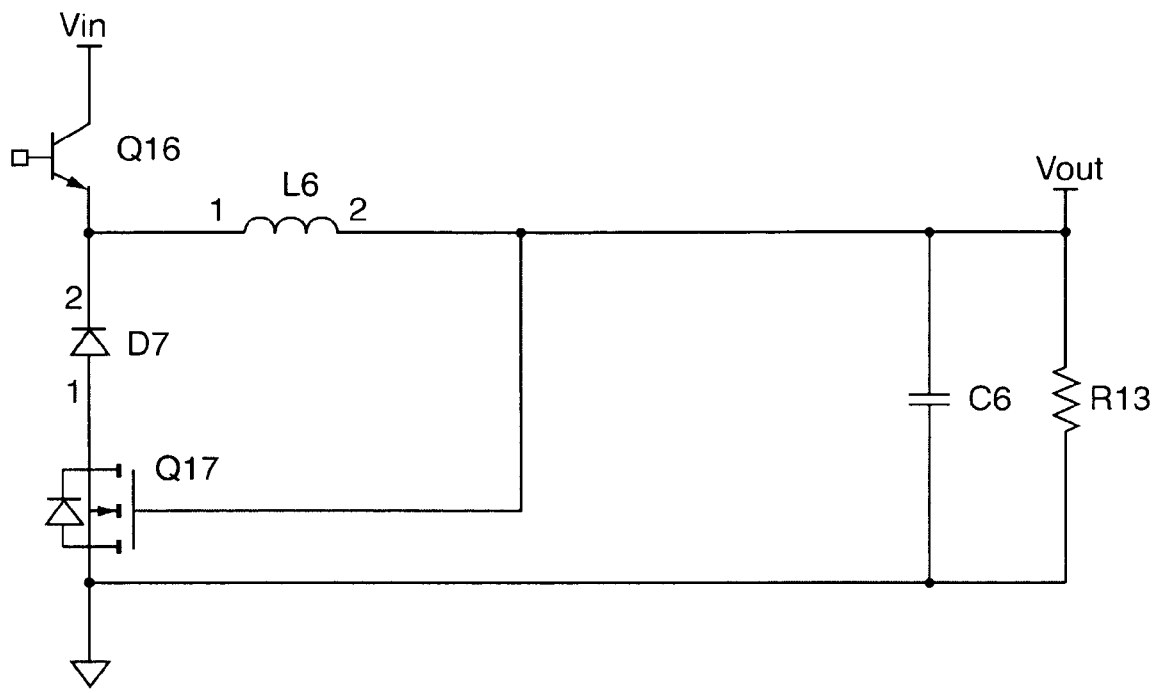
FIG. 24 is a general and simplified schematic drawing showing still another embodiment of a synchronous, buck converter comprising a reset mechanism including a N channel MOSFET transistor and diode in series with non-synchronous rectifier.
Figure 25:
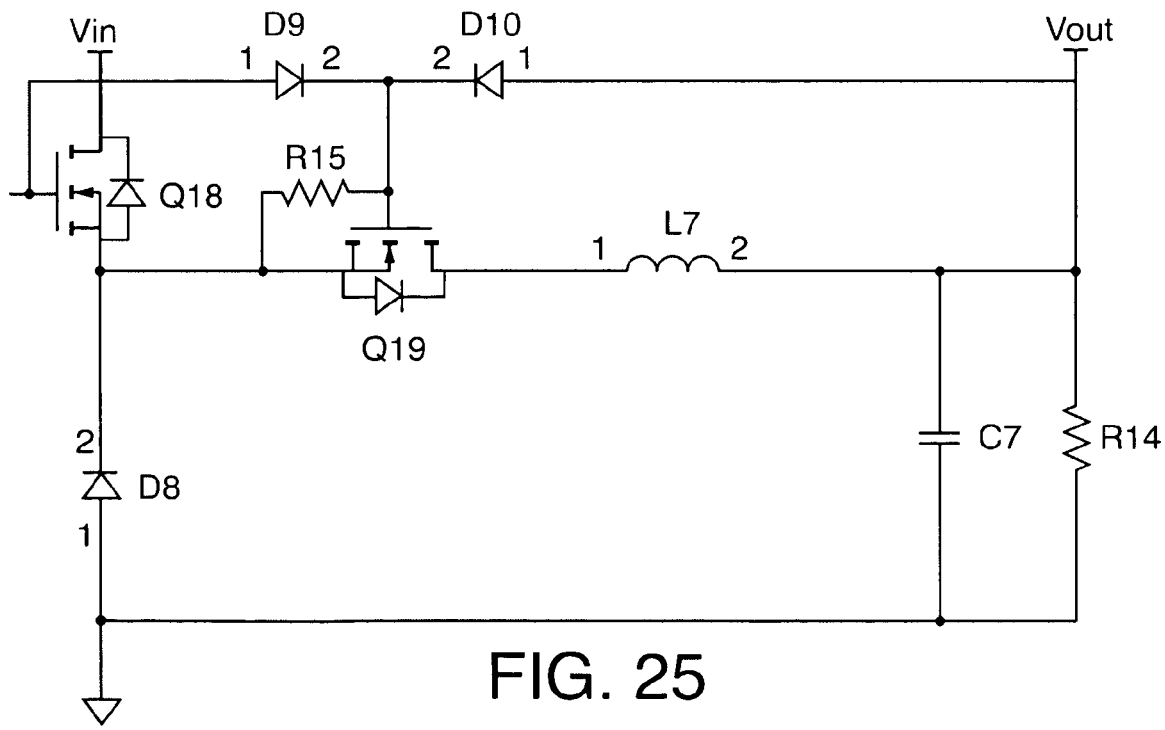
FIG. 25 is a general and simplified schematic drawing showing yet another embodiment of a non-synchronous, buck converter comprising a reset mechanism including a N channel MOSFET transistor in an alternate position from that shown in FIG. 9, and a reset diode in series with but upstream from an inductor.

Other embodiments include positioning the reset mechanism in different locations within the converter circuit. FIG. 24 shows one embodiment, wherein the reset mechanism includes the MOSFET Q17 and reset diode D17 positioned between the anode of the non-synchronous diode D7, and system ground. In this embodiment, the gate of MOSFET Q17 is connected between the inductor L8 and the output terminal shown at Vout. During normal operations, the MOSFET Q17 is turned on providing a current path of little resistance between its source and drain, while during fault conditions, the transistor Q17 is turned off so that current flows through the reset diode D17 connected. Again in the former state, the MOSFET provides a signal path of little resistance, while in the fault condition current flows through diode D17 so as to provide a voltage drop between the anode of diode D7 and system ground. In this embodiment the switch node SN must tolerate a negative voltage (typically at least −1V below system ground The N-channel MOSFET can also be located at other positions within the converter circuit. For example, as shown in FIG. 25, a reset mechanism includes N-channel MOSFET Q19 and reset diode D19 connected in series with but upstream from the inductor L7. In this particular embodiment, the switching transistor of the converter shown at Q18 has its gate connected to an anode of diode D9, which in turn has its cathode connected to the gate of transistor D19. The gate of transistor D19 is connected through the biasing resistor R15 to its source. The transistor Q19 has its drain connected to inductor L7. The gate of transistor D19 is also connected to the cathode of diode D10, while the anode of diode D10 is connected to the output Vout. During normal operation diode D9 will turn on transistor Q19 when transistor Q18 is on. Diode D10 will turn on transistor Q19 when transistor Q18 is off and inductor current flows through freewheeling diode D8. Transistor Q19 turns off as intended only when the output is short circuited and inductor current flows through freewheeling diode D8. In that instance, current will flow through diode D19 providing the diode voltage drop for the reset mechanism.

Figure 26:
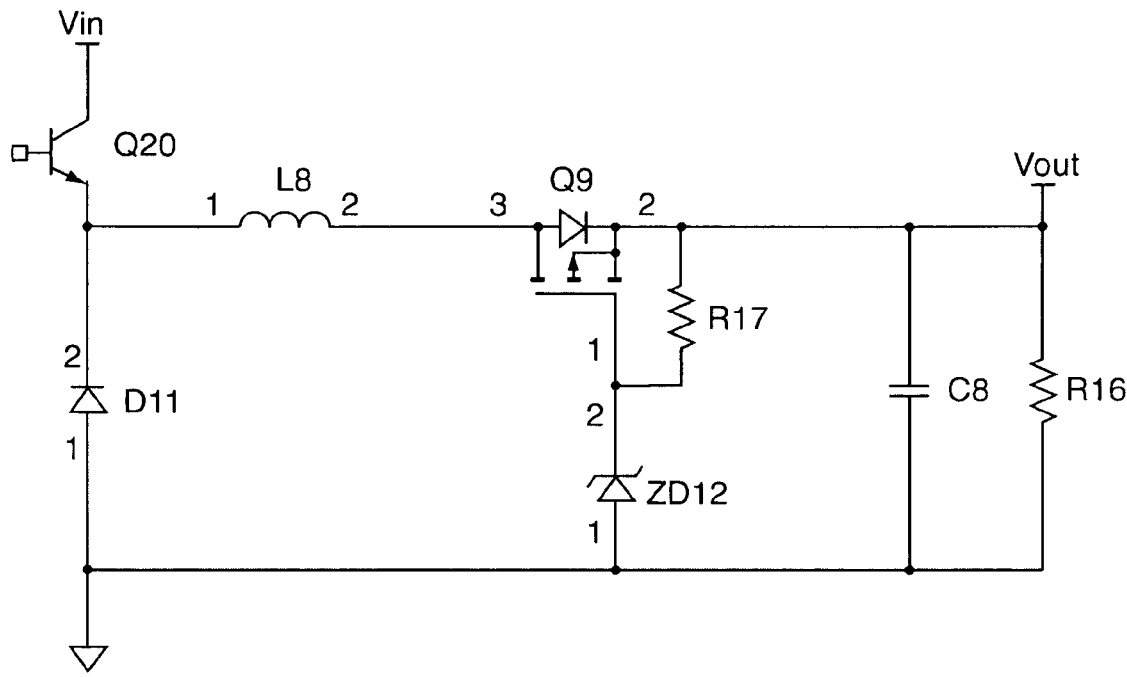
FIG. 26 is a general and simplified schematic drawing showing still another embodiment a non-synchronous, buck converter comprising a reset mechanism including a P-channel MOSFET transistor with reset diode and additional circuitry to selectively define the reset behavior.

In yet another implementation, modifications can be provided to allow the reset mechanism to operate when the output voltage Vout exceeds a preset limit, even though the output is not completely short circuited. For purposes of this disclosure and the claims that follow, the term "fault conditions" includes such situations when the output voltage Vout exceeds this present limit. As shown in FIG. 26, a bias resistor R17 is connected between the source and gate of the P-channel MOSFET Q9, while a zener diode ZD12 has its cathode connected to the gate of the MOSFET Q9 and its anode connected to system ground. By choosing values of R17, and the voltage drop provided by zener diode ZD12 a preset voltage is programmed into the circuit which will set the voltage for turning the transistor Q9 off. Thus, during operation when Vout exceeds the programmed level, the zener diode ZD12 will reach its zener breakdown and conduct creating a predetermined voltage across the resistor R17 causing the transistor Q9 to turn off. This results in the reset diode D9 conducting the current from the drain to the source of the transistor, providing a reset condition. It should be evident that the zener breakdown of zener diode ZD12 can be preselected for a predetermined value so as to program the reset mechanism to respond when the output voltage Vout exceeds a predetermined amount even though a short has not occurred.

Figure 27:
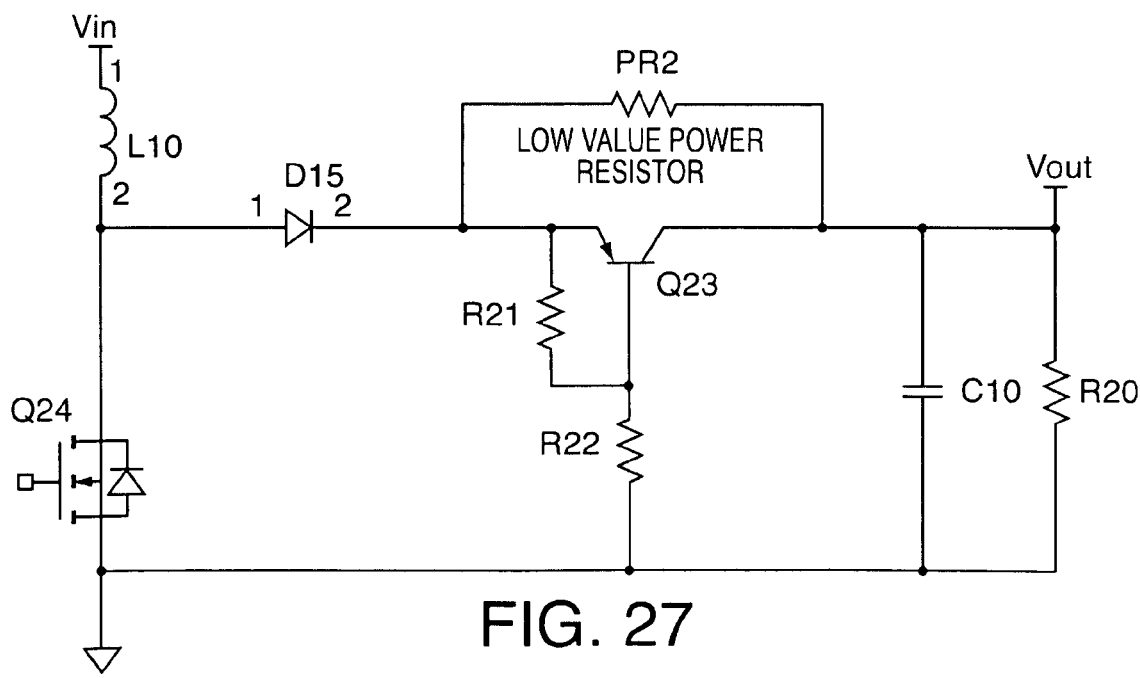
FIG. 27 is a general and simplified schematic drawing showing yet another embodiment a non-synchronous, boost converter comprising a reset mechanism including a PNP bipolar transistor and a reset power resistor.

While the previously described embodiments are shown as buck converters, the reset mechanism can be used in other types of converters as well. For example, FIG. 27 shows a boost converter including a reset mechanism. The reset mechanism can take many forms. In the embodiment shown, the reset mechanism includes the PNP bipolar transistor Q23 and the low value reset power resistor PR2. Resistors R21 and R22 provide the necessary bias to turn transistor Q23 on during normal operations, and off during fault conditions at the output Vout. In should be noted that in this embodiment the inductor L10 is connected between the input Vin and the node SN. The node SN in turn is connected to the drain of transistor Q24, the latter having its source connected to system ground. The node SN is also connected to the anode of diode D15, which in turn is connected to the emitter of transistor Q23, the resistor R21, and the reset power resistor PR2. During normal operations the transistor Q23 is on, and current flows primarily through the transistor. However, during fault conditions, the transistor Q23 will turn off, and current flows through resistor PR2 creating a voltage drop across the resistor.

Figure 28:
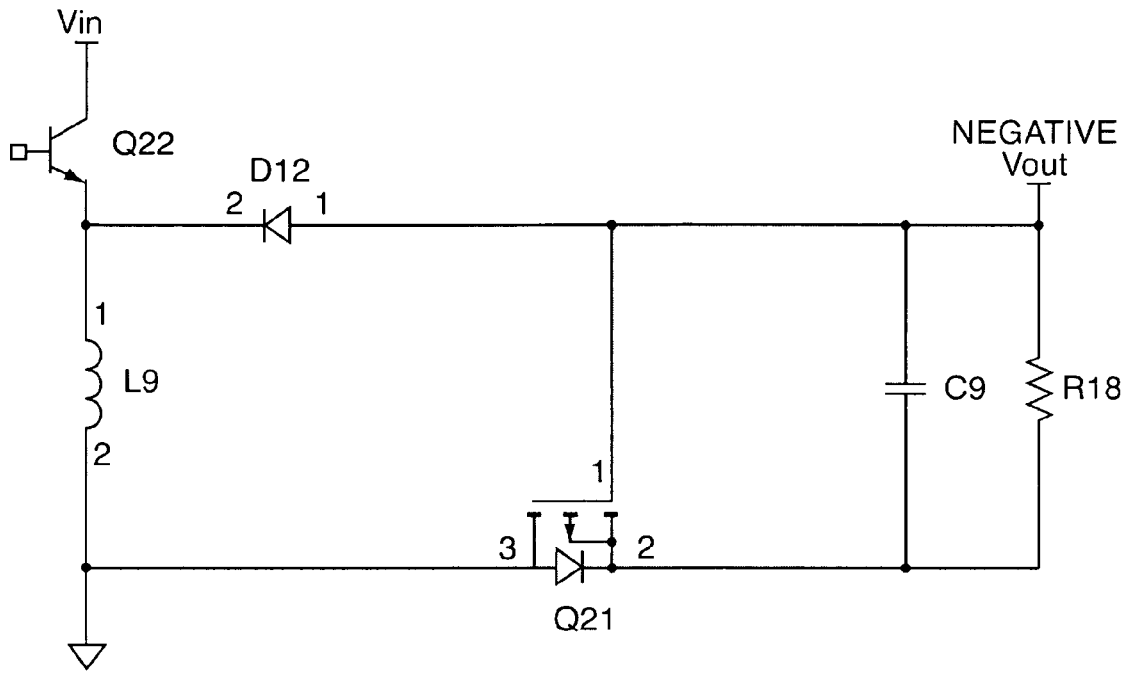
FIG. 28 is a general and simplified schematic drawing showing still another embodiment a non-synchronous, buck boost converter comprising a reset mechanism including a P-channel MOSFET and reset diode.

Another type of converter that can incorporate a reset mechanism is shown in FIG. 28. The converter is a buck boost converter. The reset mechanism includes the MOSFET Q21 and the reset diode D21. In this embodiment, the buck boost converter includes the NPN transistor Q22 having its base configured to receive the pulse width modulation control signal, its collector connected to receive the input voltage Vin, and its emitter connected to the signal node SN. The signal node SN in turn is connected to one end of inductor L9, with the other end of inductor L9 being connected to system ground. The signal node SN is also connected to the cathode of diode D12, with the anode of the latter being connected to the gate of MOSFET Q21. The drain of MOSFET transistor D21 of the reset mechanism is connected to system ground, while its source is connected to the output capacitor C9 and resistor R18. The anode of diode D12, the gate of MOSFET Q21, output capacitor C9 and resistor R18 are all connected to the output terminal Vout. It should be noted that the output will be a voltage that is inverted in polarity from that of the input. Thus, where the input voltage Vin is positive, the output voltage is negative as indicated at negative Vout.

Figure 29:
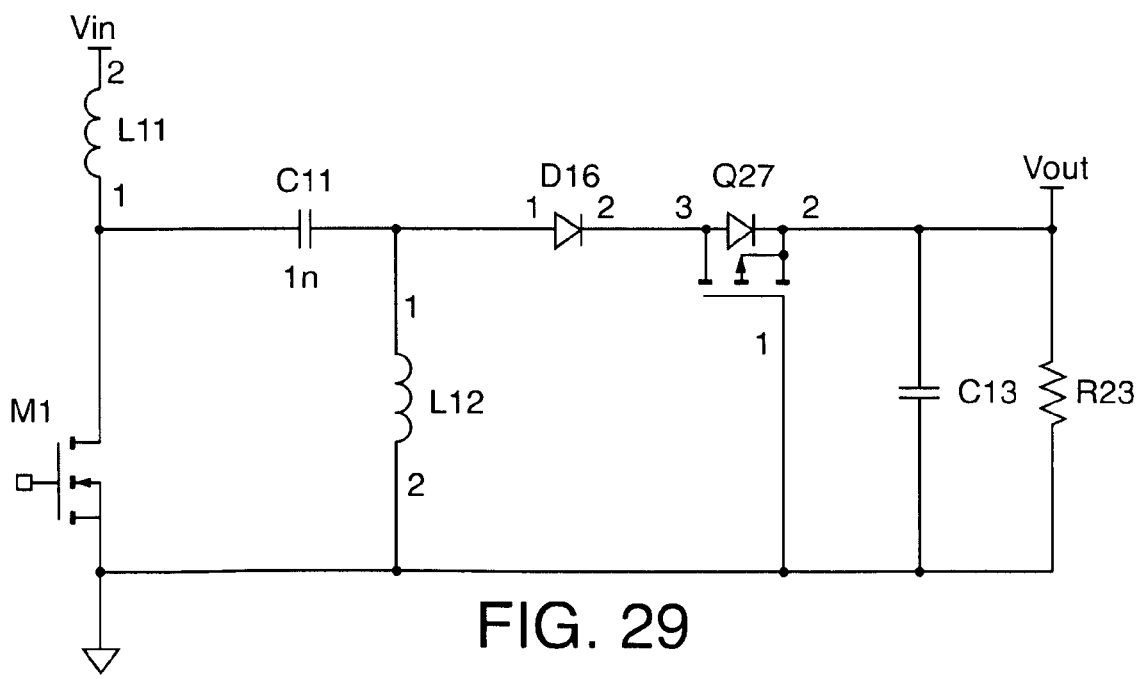
FIG. 29 is a general and simplified schematic drawing showing an embodiment of a SEPIC converter comprising a reset mechanism including a P-channel MOSFET and reset diode.

Another type of converter that can incorporate the reset mechanism is a SEPIC, an embodiment of which is shown in FIG. 29. A SEPIC (single ended primary inductor converter) is a DC-DC converter which allows the output voltage to be greater than, less than, or equal to the input voltage. The output voltage of the SEPIC is controlled by the duty cycle of the control transistor, in this case M1. The biggest advantage of a SEPIC over the buck-boost converter is a non-inverted output (positive voltage). As shown in FIG. 29, The input Vin is connected to one end of the inductor L11, while the other end of inductor L11 is connected to the signal node SN. Signal node SN is in turn connected to the drain of the control MOSFET M1, which in turn has its source connected to system ground. Signal node SN is also connected to the capacitor C11, which in turn is connected to one end of the inductor L12 and the anode of diode D16. The cathode of diode D16 is in turn connected to the drain of MOSFET Q27 and the anode of reset diode D27. The cathode of reset diode D27 and the source of MOSFET Q27 are connected to Vout. The other end of inductor L12 and the gate of MOSFET Q27 are connected to system ground. Again during normal operation, the MOSFET Q27 is on and conducts current between the source and drain. However, during fault conditions at the output Vout, the MOSFET Q27 will turn off, and current will flow through the reset diode D27.

Figure 30:
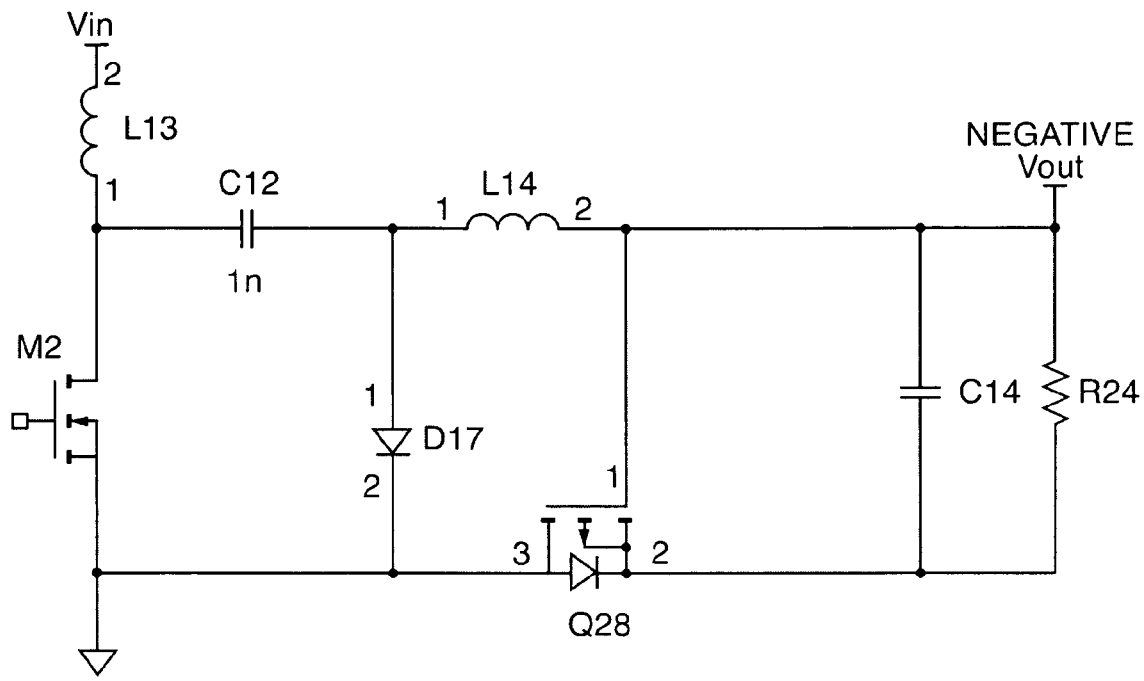
FIG. 30 is a general and simplified schematic drawing showing an embodiment of a CUK converter comprising a reset mechanism including a P-channel MOSFET and reset diode.

Yet another type of converter that can incorporate the reset mechanism is a CUK converter, an embodiment of which is shown in FIG. 30. The CUK converter is a type of DC-DC converter that has an output voltage magnitude that is either greater than or less than the input voltage magnitude, with an opposite polarity. In the FIG. 30 embodiment, the MOSFET Q28 and reset diode D28 are connected between system ground and the output capacitor C14 and resistor R24. The pulse width modulation signal is applied to the gate of MOSFET M2, the latter having its source connected to system ground, and its drain connected to the signal node SN. The CUK converter has its input Vin connected to one end of inductor L13, which in turn has its other end connected to the signal node SN. Signal node SN is connected to capacitor C12, which in turn is connected to the anode of diode D17 and the second inductor L14. The cathode of diode D17 is connected to system ground, while the inductor L14 has its other end connected to the output Negative Vout. Again, during normal operating conditions the MOSFET Q28 is on and conducts most of the current through a low resistance path, while fault conditions at the output results in the MOSFET Q28 switching off, and the current flowing through reset diode D28.

Figure 31:
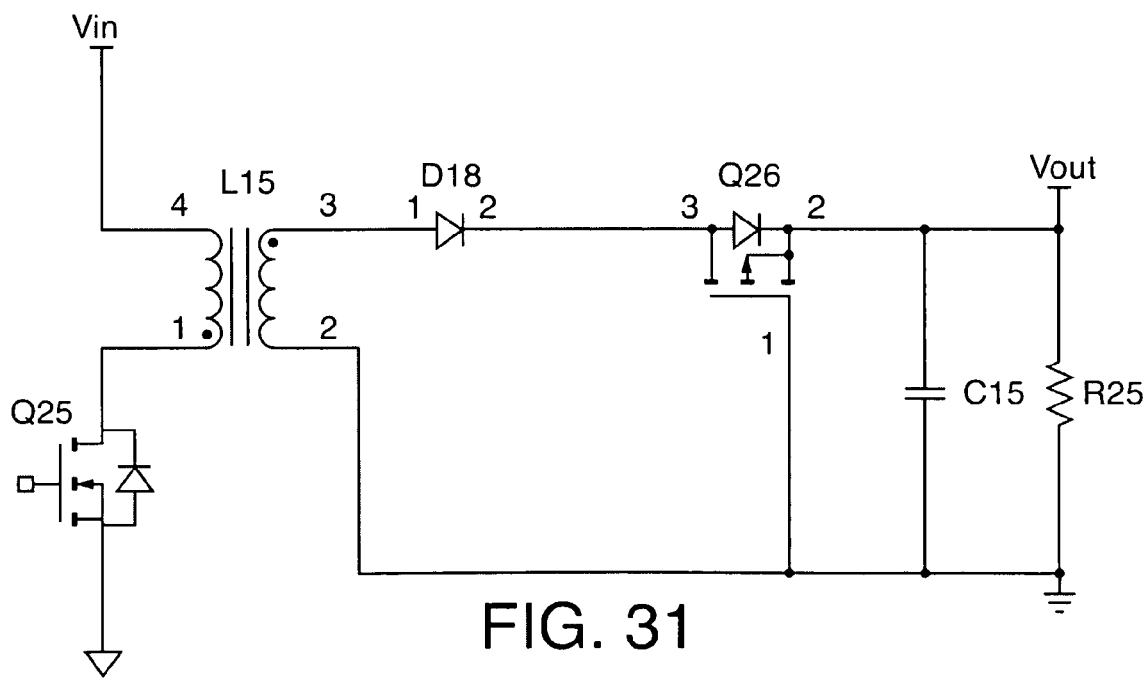
FIG. 31 is a general and simplified schematic drawing showing an embodiment of a flyback isolated converter comprising a reset mechanism including a P-channel MOSFET transistor and reset diode.

Still another type of converter that can incorporate the reset mechanism is a flyback isolated converter. FIG. 31 illustrates an embodiment of such a converter with a P-channel MOSFET and reset diode. The flyback converter is a DC to DC converter with a galvanic isolation between the input and the output(s). More precisely, the flyback converter is a buck-boost converter with the inductor split to form a transformer, so that the voltage ratios are multiplied with an additional advantage of isolation. The transformer is shown at L15 in the embodiment of FIG. 31, having one end of its primary coil coupled to the input Vin, and its other end to the flyback pulse width modulation, current limit control signal at the gate of MOSFET Q25. One end of the secondary coil of the transformer L15 is connected to system ground, and its other end to the anode of diode D18. The cathode of diode D18 is in turn connected to the drain of MOSFET Q26 and the anode of reset diode D26. The gate of MOSFET D26 is connected to system ground. The source of MOSFET Q26 and the cathode of reset diode D26 are connected to the output Vout. During normal operation the MOSFET transistor Q26 stays on, and current flows through the resistance path of the MOSFET 26. During fault conditions, the transistor Q26 will turn off, and the current will flow through the reset diode D26.

Figure 32:
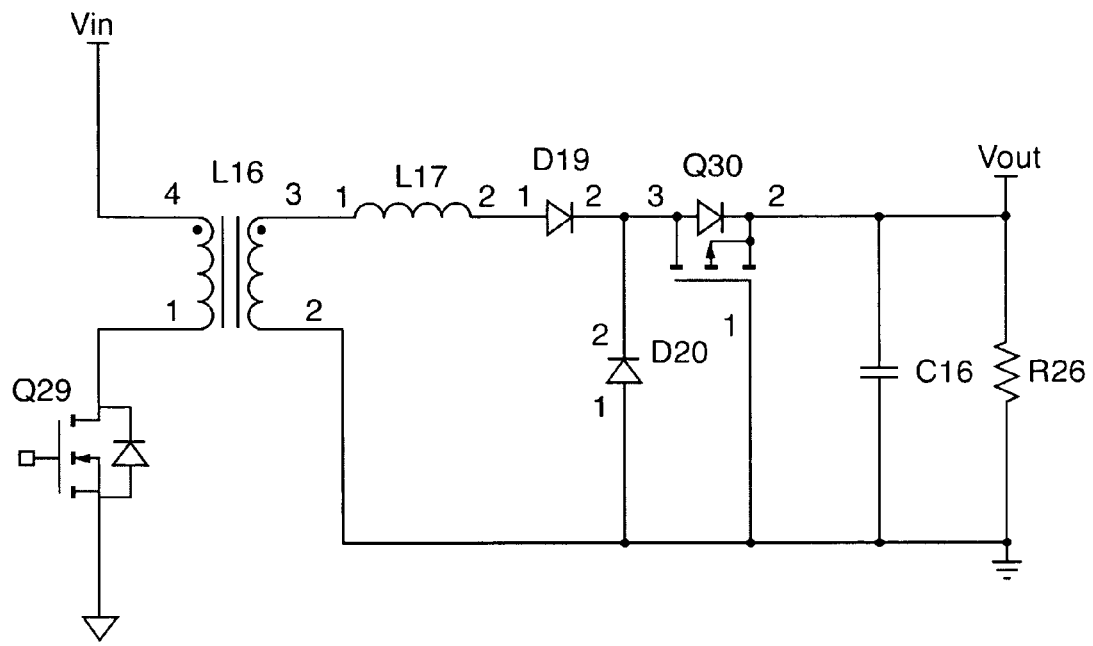
FIG. 32 is a general and simplified schematic drawing showing an embodiment of a forward isolated converter comprising a reset mechanism including a P-channel MOSFET and reset diode.

And yet another type of converter that can incorporate the reset mechanism is a forward isolated converter. FIG. 32 shows an embodiment of such a converter with a P channel MOSFET and reset diode. A forward converter is used to provide a regulated output (or load) voltage (Vout) which, due to the transformer turns ratio, can be higher or lower than the input voltage (Vin) supplied by the input power supply. By employing a transformer between the input voltage Vin and the output voltage Vout, the output can be isolated from the input. In the FIG. 32 embodiment, the transformer L16 has its primary coil connected at one end to the input Vin, and its other end to the control MOSFET Q29. The secondary coil of transformer L16 is connected to one end of inductor L17, and its other end to system ground. The inductor L17 has its other end connected the anode of diode D19, which has its cathode connected to the cathode of diode D20, and to the drain of the MOSFET Q30 of the reset mechanism The gate of MOSFET Q30 has its gate connected to system ground, while its drain connected to the output terminal Vout. Reset mechanism also includes a reset diode D30 connected between the drain and source of MOSFET Q30. Once again during normal operation MOSFET Q30 is on and conducts current, while during fault conditions at the output, MOSFET Q30 will turn off, and current will flow through the reset diode D30.

And still another type of converter that incorporate the reset mechanism is the synchronous buck converter, two embodiments being illustrated in FIGS. 33 and 34. A synchronous buck converter is a modified version of the basic buck converter circuit topology in which the freewheeling diode is replaced by a second switch, in this instance MOSFET Q36. In a standard buck converter, the freewheeling diode turns on, on its own, shortly after the switch turns off, as a result of the rising voltage across the diode. By replacing freewheeling diode with MOSFET switch Q36, which is advantageously selected for low losses, the converter efficiency can be improved.

In the embodiment of FIG. 33, the arrangement is an implementation of a synchronous buck converter similar to a non-synchronous buck converter. The reset mechanism includes the MOSFET Q31 and the reset diode D31. In this embodiment the MOSFET Q31 is a P channel type MOSFET and has its drain connected to the inductor L18, and it source connected to the output Vout. Again the MOSFET Q31 will turn on during normal operation, and turn off when the output of the converter is in a fault condition. When MOSFET Q31 turns off, current flows through the reset diode D31.

In the alternate embodiment of FIG. 34, the reset mechanism includes a N channel MOSFET 34 and reset diode D34 connected in series with the synchronous N channel MOSFET Q38. This implementation also requires a switch node SN that can tolerate at least a −1V below ground. It should be noted that the control for the MOSFET Q34 and reset diode D34 is completely separate from the synchronous transistor, MOSFET Q38. When a synchronous converter is in a fault condition, the synchronous MOSFET should be turned off which makes the converter effectively nonsynchronous and the forward voltage drop on body diode of synchronous MOSFET Q38 helps reset the inductor. For those controllers with significant minimum on time the reset capability o f the body diode of transistor Q38 may not be sufficient and requires the additional reset transistor Q34 and diode D34.

Because certain changes can be made to the above described apparatus and methods without departing from the scope of the invention, it is intended that all matter contained in the above description or shown in the accompanying drawings shall be interpreted as illustrative and not in a limiting sense.

What is claimed is:

1. A switch mode converter configured to convert an input DC voltage applied at one level at the converter input to an output DC voltage at a second level at the converter output, the converter comprising:
a switch configured to switch the input DC voltage on and off during each cycle of a plurality of cycles;
energy storage configured to temporarily store energy from the input source voltage when the switch is on, and release energy when the switch is off during each cycle, wherein the input energy stored is equal to the energy released with each cycle and achieves equilibrium when the converter is operating into normal loads; and
a reset mechanism configured to provide additional reset voltage during each cycle to achieve equilibrium when the converter is operating in a fault condition.

2. A switch mode converter according to claim 1, wherein the energy storage is a magnetic storage device.

3. A switch mode converter according to claim 2, wherein the magnetic storage device is a transformer.

4. A switch mode converter according to claim 2, wherein the magnetic storage device is an inductor.

5. A switch mode converter according to claim 1, wherein the reset includes a diode arrangement for conducting current to achieve equilibrium when the converter operates in normal loads, and for creating an additional reset voltage to the energy storage to achieve equilibrium when the converter operates in a fault condition.

6. A switch mode converter according to claim 5, wherein the diode arrangement includes a MOSFET connected in a diode configuration.

7. A switch mode converter according to claim 5, wherein the diode arrangement includes a plurality of MOSFETS each connected in a diode configuration in series, parallel, or a combination of series and parallel, the number of MOSFETs being a function of the average input DC voltage.

8. A switch mode converter according to claim 5, wherein the MOSFET is an N-channel MOSFET.

9. A switch mode converter according to claim 8, wherein the reset mechanism further includes a diode.

10. A switch mode converter according to claim 5, wherein the MOSFET is a P-channel MOSFET.

11. A switch mode converter according to claim 10, wherein the reset mechanism further includes a diode.

12. A switch mode converter according to claim 10, wherein the reset mechanism further includes a reset N-channel MOSFET.

13. A switch mode converter according to claim 1, wherein the reset mechanism and energy storage are connected in series.

14. A switch mode converter according to claim 13, wherein the reset mechanism is in series and upstream from the energy storage.

15. A switch mode converter according to claim 1, wherein the reset mechanism and energy storage are connected in parallel.

16. A switch mode converter according to claim 1, wherein the reset mechanism is in series with a synchronous rectifier.

17. A switch mode converter according to claim 1, wherein the reset includes a diode arrangement for conducting current to achieve equilibrium when the converter operates in normal loads, and for creating an additional reset voltage to the energy storage to achieve equilibrium when the converter operates in a fault condition, and the diode arrangement includes a bipolar transistor connected in a diode configuration.

18. A switch mode converter according to claim 17, wherein the reset mechanism includes a PNP bipolar transistor.

19. A switch mode converter according to claim 17, wherein the reset mechanism further includes a power resistor.

20. A switch mode converter according to claim 17, wherein the reset mechanism includes an NPN transistor.

21. A switch mode converter according to claim 20, wherein the reset mechanism further includes a diode.

22. A switch mode converter according to claim 1, wherein the reset includes a diode arrangement for conducting current to achieve equilibrium when the converter operates in normal loads, and for creating an additional reset voltage to the energy storage to achieve equilibrium when the converter operates in a fault condition, and the diode arrangement includes a plurality of bipolar transistors each connected in a diode configuration in series, parallel, or a combination of series and parallel, the number of bipolar transistors being a function of the average input DC voltage.

23. A switch mode converter according to claim 1, wherein the reset includes a diode arrangement for conducting current to achieve equilibrium when the converter operates in normal loads, and for creating an additional reset voltage to the energy storage to achieve equilibrium when the converter operates in a fault condition, and the diode arrangement includes a IGBT connected in a diode configuration.

24. A switch mode converter according to claim 1, wherein the reset includes a diode arrangement for conducting current to achieve equilibrium when the converter operates in normal loads, and for creating an additional reset voltage to the energy storage to achieve equilibrium when the converter operates in a fault condition, and the diode arrangement includes a plurality of IGBTs each connected in a diode configuration in series, parallel or a combination of series and parallel, the number of IGBTs being a function of the average input DC voltage.

25. A switch mode converter according to claim 1, wherein the reset mechanism is configured to increase the reset voltage compared to a single reset diode.

26. A switch mode converter according to claim 1, where in the reset mechanism is configured to increase the current capability compared to a single reset diode.

27. A switch mode converter according to claim 1, wherein the reset mechanism includes a resistor arrangement for conducting current to achieve equilibrium when the converter operates in normal loads, and for creating an additional reset voltage to the energy storage to achieve equilibrium when the converter operates in a fault condition.

28. A switch mode converter according to claim 1, wherein the reset includes a reset current path, the path including a freewheeling diode configured to provide a reset voltage at the end of each cycle to achieve equilibrium when the converter operates into normal loads equilibrium, and a diode arrangement configured with the freewheeling diode to artificially increase the reset voltage at the end of each cycle to achieve equilibrium when the converter operates in an fault condition.

29. A switch mode converter according to claim 1, wherein the reset includes a transistor configured to function as a transistor switch when the converter operates in into normal loads, and a diode voltage drop when the converter operates in an fault condition.

30. A switch mode converter according to claim 1, wherein the switch is configured to switch the input DC voltage on and off during each cycle of a plurality of cycles at a substantially fixed frequency.

31. A switch mode converter according to claim 1, wherein the converter is configured to operate as a buck converter.

32. A switch mode converter according to claim 31, wherein the buck converter is configured to be synchronous.

33. A switch mode converter according to claim 31, wherein the buck converter is configured to be non-synchronous.

34. A switch mode converter according to claim 33, wherein the non-synchronous buck converter is configured to be continuous mode.

35. A switch mode converter according to claim 1, wherein the converter is configured to operate as a boost converter.

36. A switch mode converter according to claim 1, wherein the converter is configured to operate as a SEPIC converter.

37. A switch mode converter according to claim 1, wherein the converter is configured to operate as a CUK converter.

38. A switch mode converter according to claim 1, wherein the converter is configured to operate as a flyback isolated converter.

39. A switch mode converter according to claim 1, wherein the converter is configured to operate as a forward isolated converter.

40. A switch mode converter configured to convert an input DC voltage applied at one level at the converter input to an output DC voltage at a second level at the converter output, the converter comprising:
a switch configured to switch the input DC voltage on and off during each cycle of a plurality of cycles at a substantially fixed frequency;
energy storage configured to temporarily store energy from the input source voltage when the switch is on, and release energy when the switch is off during each cycle, wherein the input energy stored is equal to the energy released with each cycle and achieves equilibrium when the converter is operating into normal loads; and
a reset mechanism including a switch operable in a first state so as to conduct energy from the input DC voltage to the energy storage during equilibrium conditions, and a second state for creating additional reset voltage to the energy storage sufficient to achieve equilibrium when the converter is operating in an fault condition.

41. A method of resetting a switch mode converter when operating in an fault condition so the converter operates in equilibrium, the converter being of the type comprising a switch configured to switch the input DC voltage on and off during each cycle of a plurality of cycles, and energy storage configured to temporarily store energy from the input source voltage when the switch is on, and release energy when the switch is off during each cycle, wherein the input energy stored is equal to the energy released with each cycle and achieves equilibrium when the converter is operating into normal loads, the method comprising:
generating additional reset voltage during each cycle only when the converter is operating in an fault condition so as reset the converter to an equilibrium condition.

* * * * *